(12) United States Patent
McCarthy et al.

(10) Patent No.: US 7,183,488 B2
(45) Date of Patent: Feb. 27, 2007

(54) ELECTROMAGNETICALLY INSULATED CONDUIT AND SYSTEM

(75) Inventors: Craig McCarthy, San Diego, CA (US); Stanley Dunaway, deceased, late of Oceanside, CA (US); by John Edwards, legal representative, San Diego, CA (US); G. Bradford Saunders, San Diego, CA (US)

(73) Assignee: Secured Systems Licensing, LLC, Carlsbad, CA (US)

( * ) Notice: Subject to any disclaimer, the term of this patent is extended or adjusted under 35 U.S.C. 154(b) by 0 days.

(21) Appl. No.: 11/043,017

(22) Filed: Jan. 24, 2005

(65) Prior Publication Data

US 2007/0012469 A1    Jan. 18, 2007

Related U.S. Application Data

(63) Continuation-in-part of application No. 11/022,557, filed on Dec. 22, 2004, which is a continuation-in-part of application No. 10/763,732, filed on Jan. 23, 2004, which is a continuation-in-part of application No. 10/690,272, filed on Oct. 21, 2003.

(51) Int. Cl.
*H02G 3/04* (2006.01)

(52) U.S. Cl. ............... 174/68.3; 174/68.1; 174/481; 174/72 R; 138/158; 52/220.7

(58) Field of Classification Search .......... 174/48, 174/49, 68.1, 68.3, 95, 99 R, 135, 72 A, 174/97, 100, 101, 34, 35 R, 35 GC, 480, 174/481; 138/118, 121, 156; 52/220.1, 52/220.3, 220.7, 239; 439/207, 209, 210

See application file for complete search history.

(56) References Cited

U.S. PATENT DOCUMENTS

| 2,956,587 | A | * | 10/1960 | Fisher | 174/68.3 |
|---|---|---|---|---|---|
| 3,091,657 | A | | 5/1963 | Stuessel | 174/68 |
| 3,312,251 | A | * | 4/1967 | Marks et al. | 174/68.3 |
| 3,338,599 | A | * | 8/1967 | Hallman | 174/68.3 |
| 3,562,402 | A | * | 2/1971 | Dwyer | 174/35 GC |
| 4,016,356 | A | * | 4/1977 | McLoughlin | 174/393 |
| 4,077,434 | A | * | 3/1978 | Sieckert et al. | 174/68.3 |
| 4,398,564 | A | * | 8/1983 | Young et al. | 174/68.3 |
| 5,789,064 | A | * | 8/1998 | Valente et al. | 174/388 |
| 5,831,211 | A | | 11/1998 | Gartung et al. | 174/48 |

(Continued)

FOREIGN PATENT DOCUMENTS

DE        296 06 102        7/1996

OTHER PUBLICATIONS

U.S. Appl. No. 11/022,557, filed Dec. 22, 2004, McCarthy et al.

(Continued)

*Primary Examiner*—Angel R. Estrada
(74) *Attorney, Agent, or Firm*—Blank Rome LLP

(57) ABSTRACT

A conduit includes an elongate member with an outer surface and an inner surface defining an inner passage for enclosing one or more electrical signal conductors therein, and an electromagnetic shield disposed coaxially with the elongate member to block electromagnetic radiation emitted by the one or more electrical signal conductors.

15 Claims, 35 Drawing Sheets

U.S. PATENT DOCUMENTS

| | | | | |
|---|---|---|---|---|
| 6,143,984 | A | * | 11/2000 | Auteri ........................ 174/68.3 |
| 6,150,610 | A | | 11/2000 | Sutton ........................ 174/68.3 |
| 6,274,812 | B1 | * | 8/2001 | Daoud ........................ 174/652 |
| 6,462,276 | B2 | * | 10/2002 | Shimizu et al. ............. 174/659 |
| 6,491,535 | B1 | | 12/2002 | Busé ........................... 439/215 |
| 6,838,616 | B2 | | 1/2005 | Harrison et al. .............. 174/50 |
| 6,872,888 | B2 | * | 3/2005 | Santelli, Jr. ................. 174/68.1 |
| 2004/0256020 | A1 | | 12/2004 | McCarthy et al. .......... 138/158 |
| 2005/0000584 | A1 | | 1/2005 | McCarthy et al. .......... 138/158 |

OTHER PUBLICATIONS

"Protective Distribution Systems (PDS)," *National Security Telecommunications and Information Systems Security* (*NSTISS*), No. 7003, pp. 1-13 (Dec. 13, 1996).

* cited by examiner

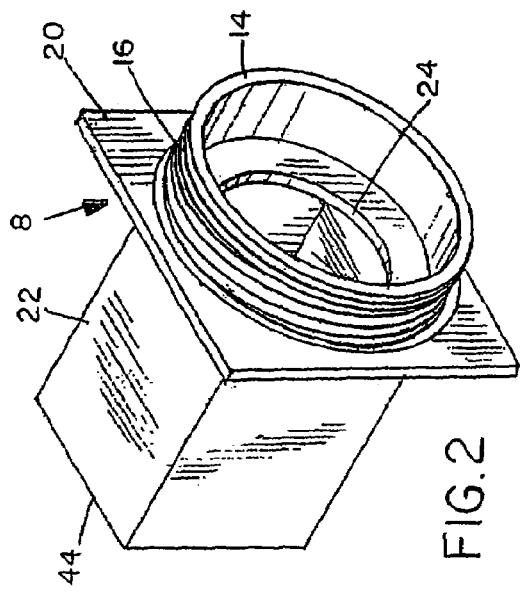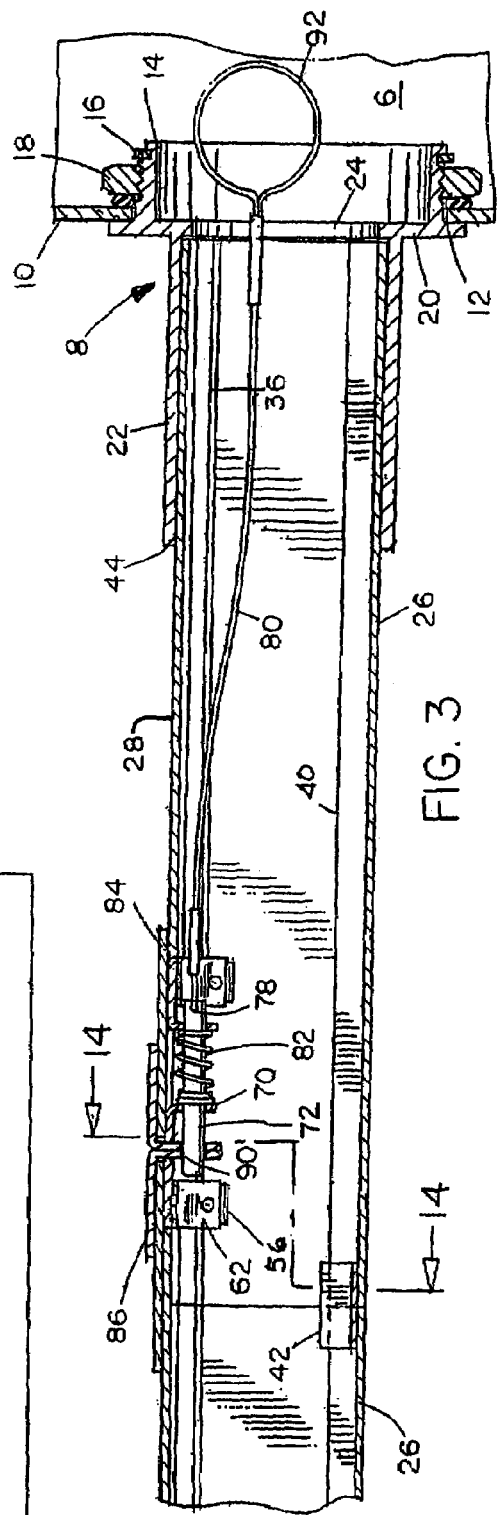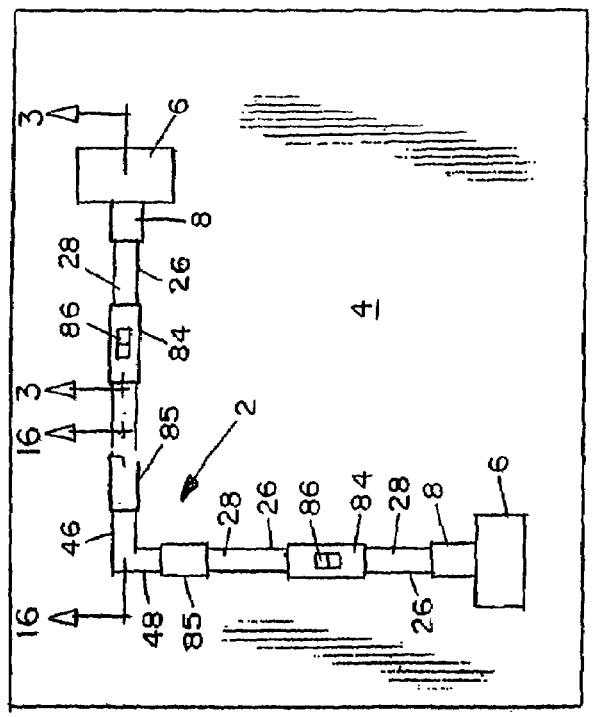

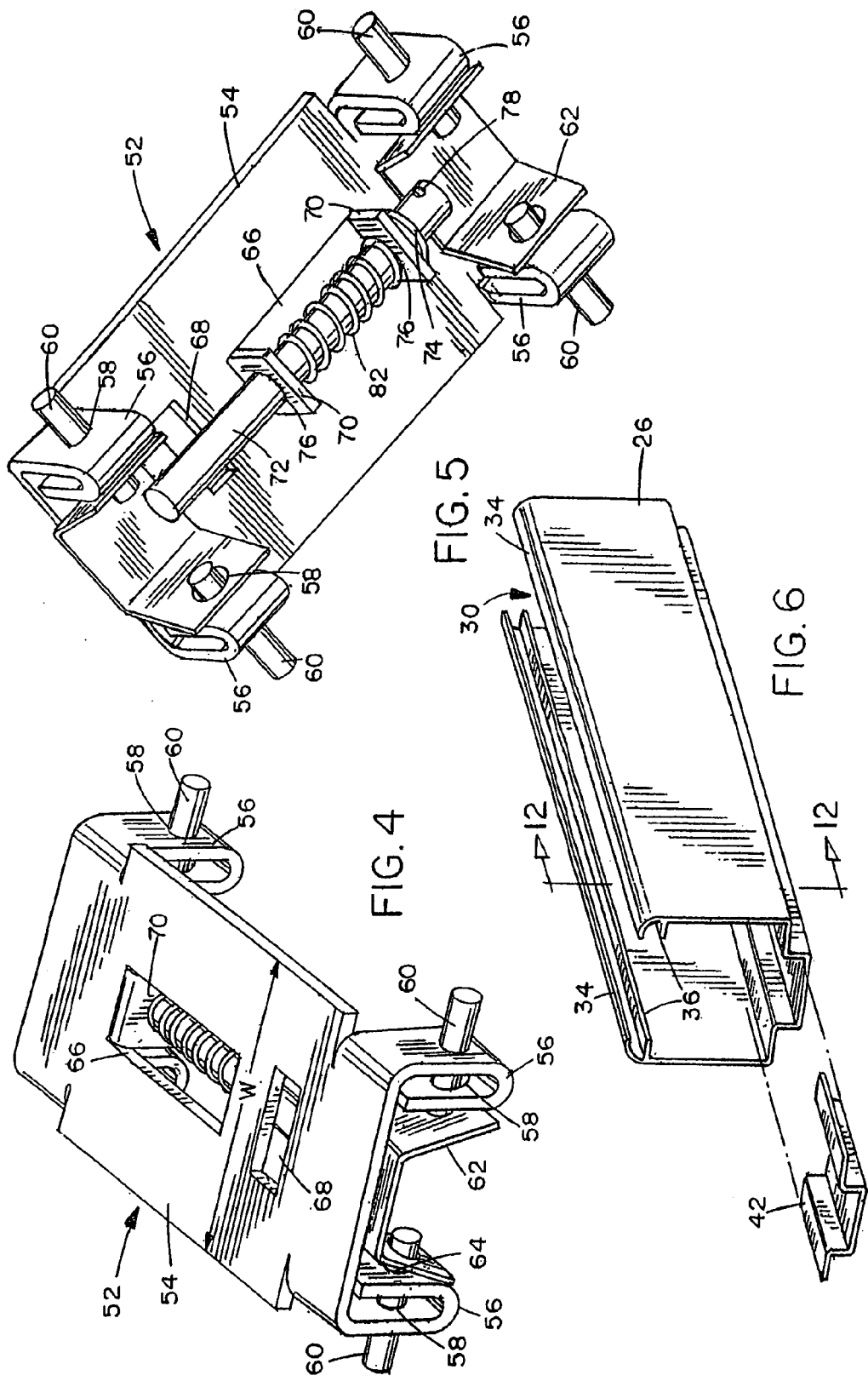

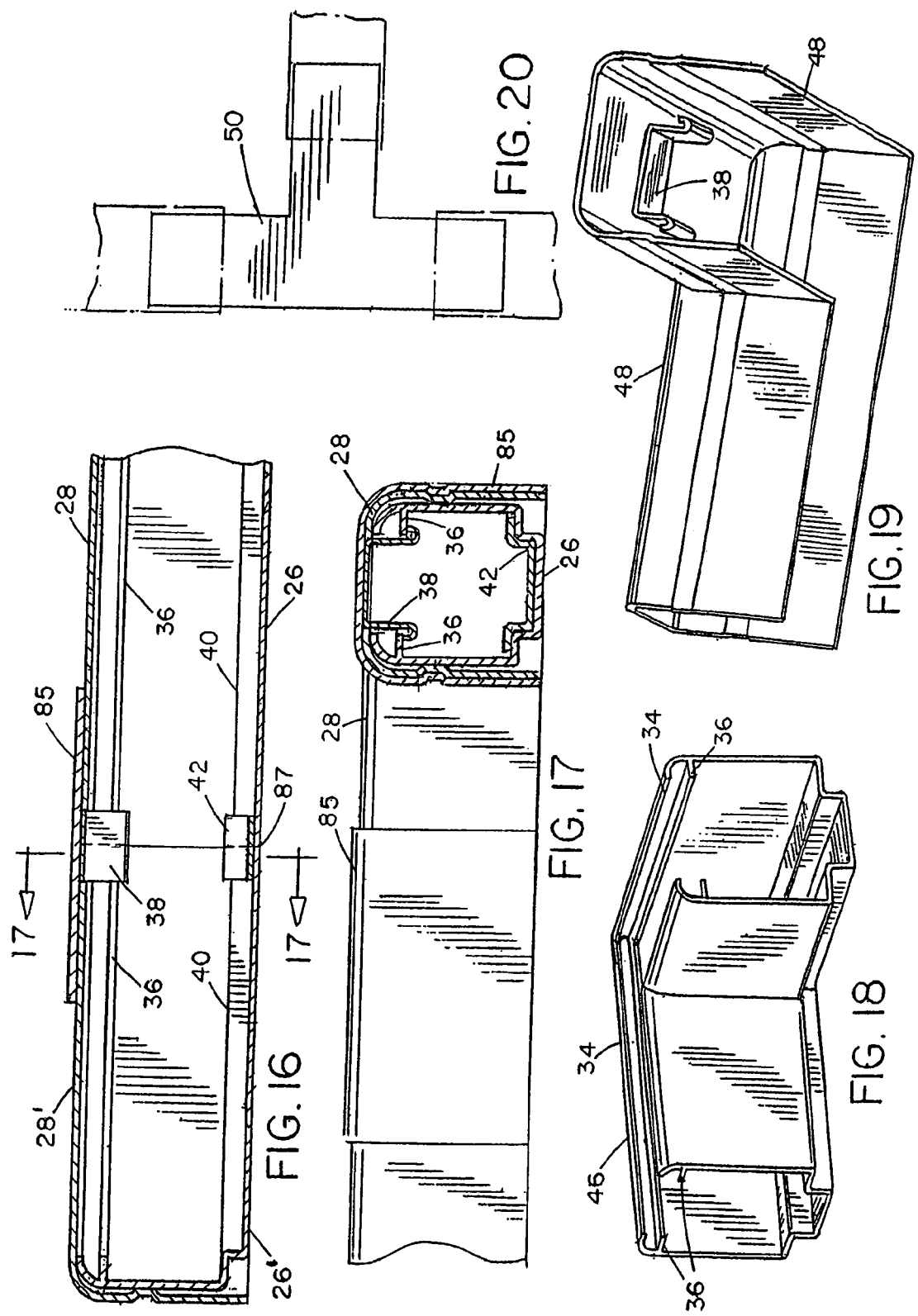

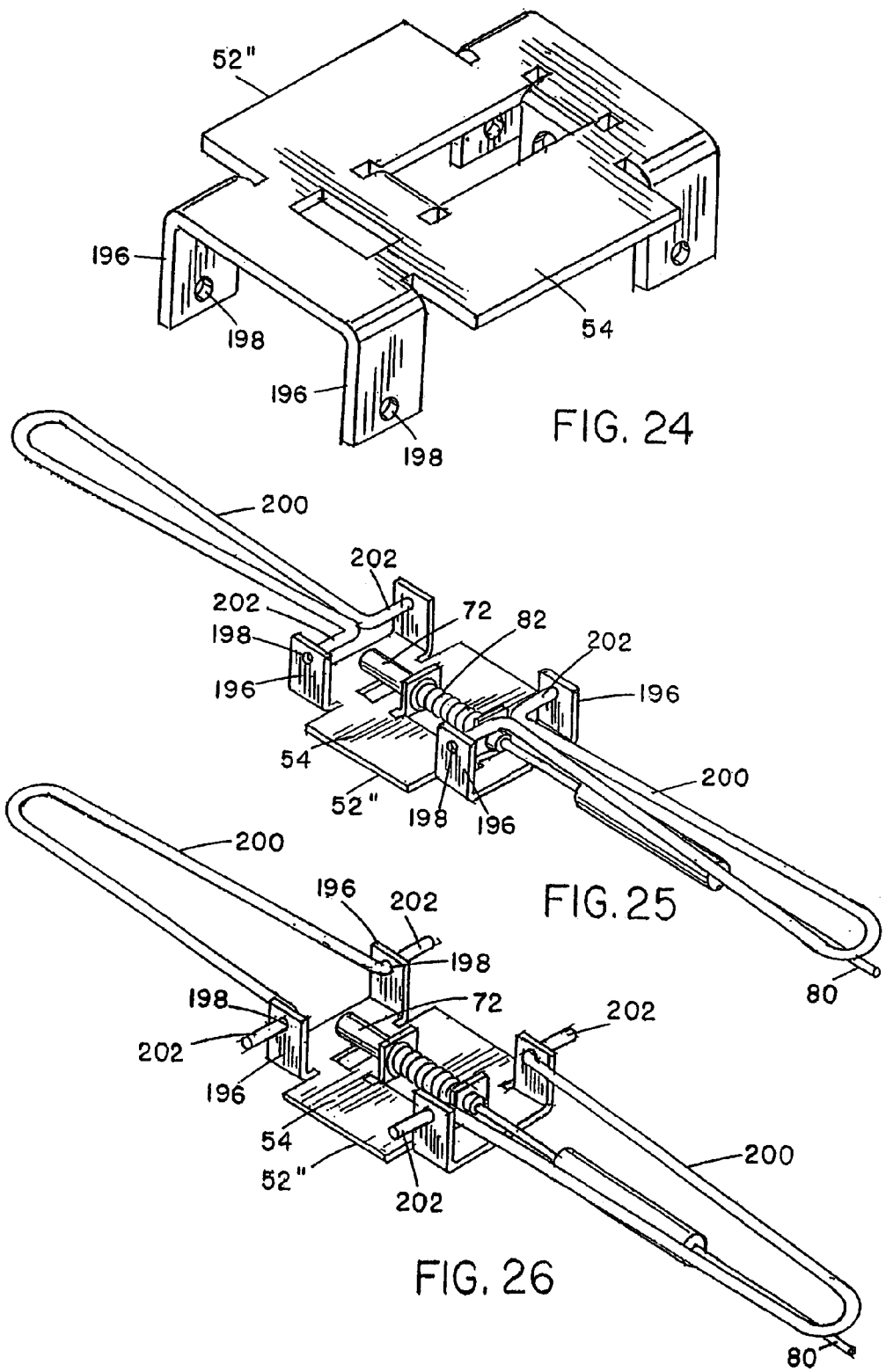

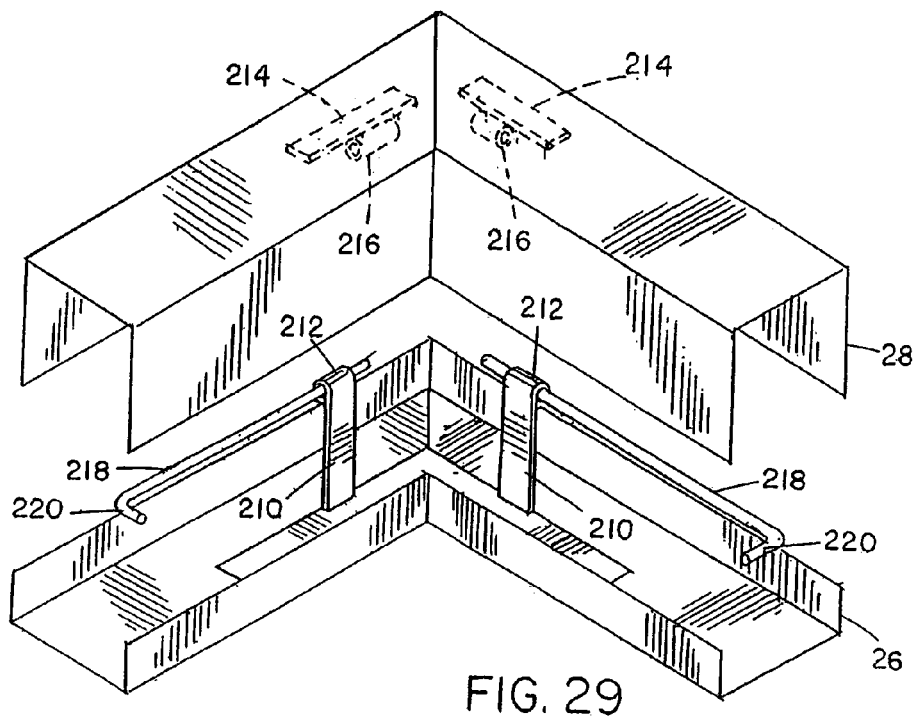
FIG. 29
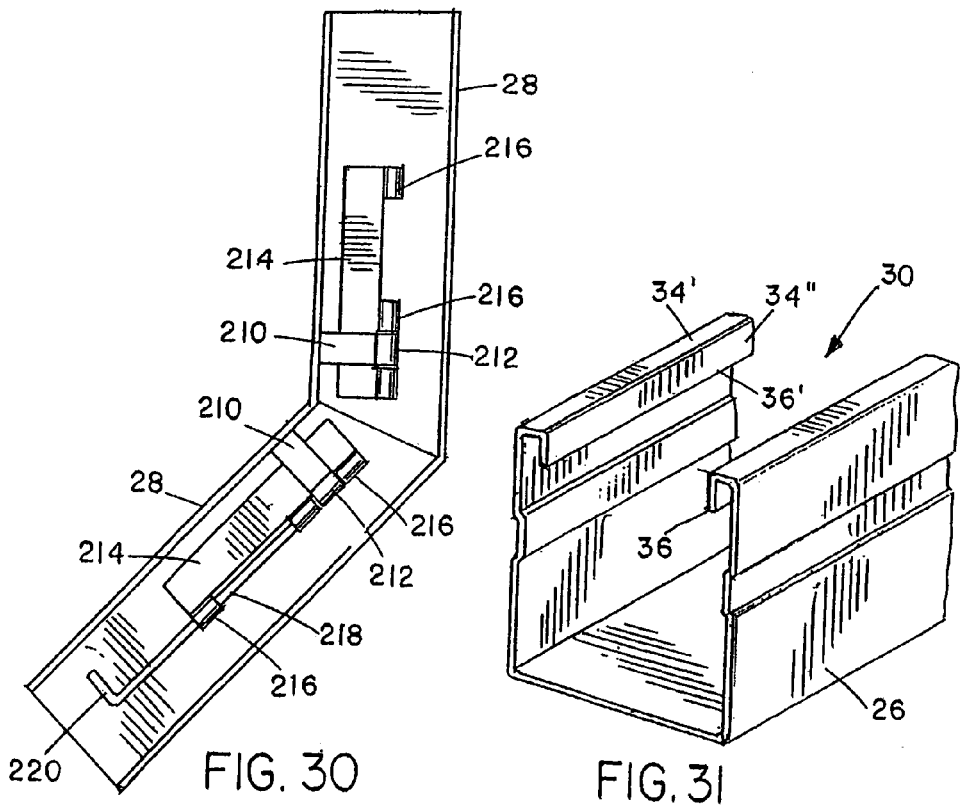
FIG. 30
FIG. 31

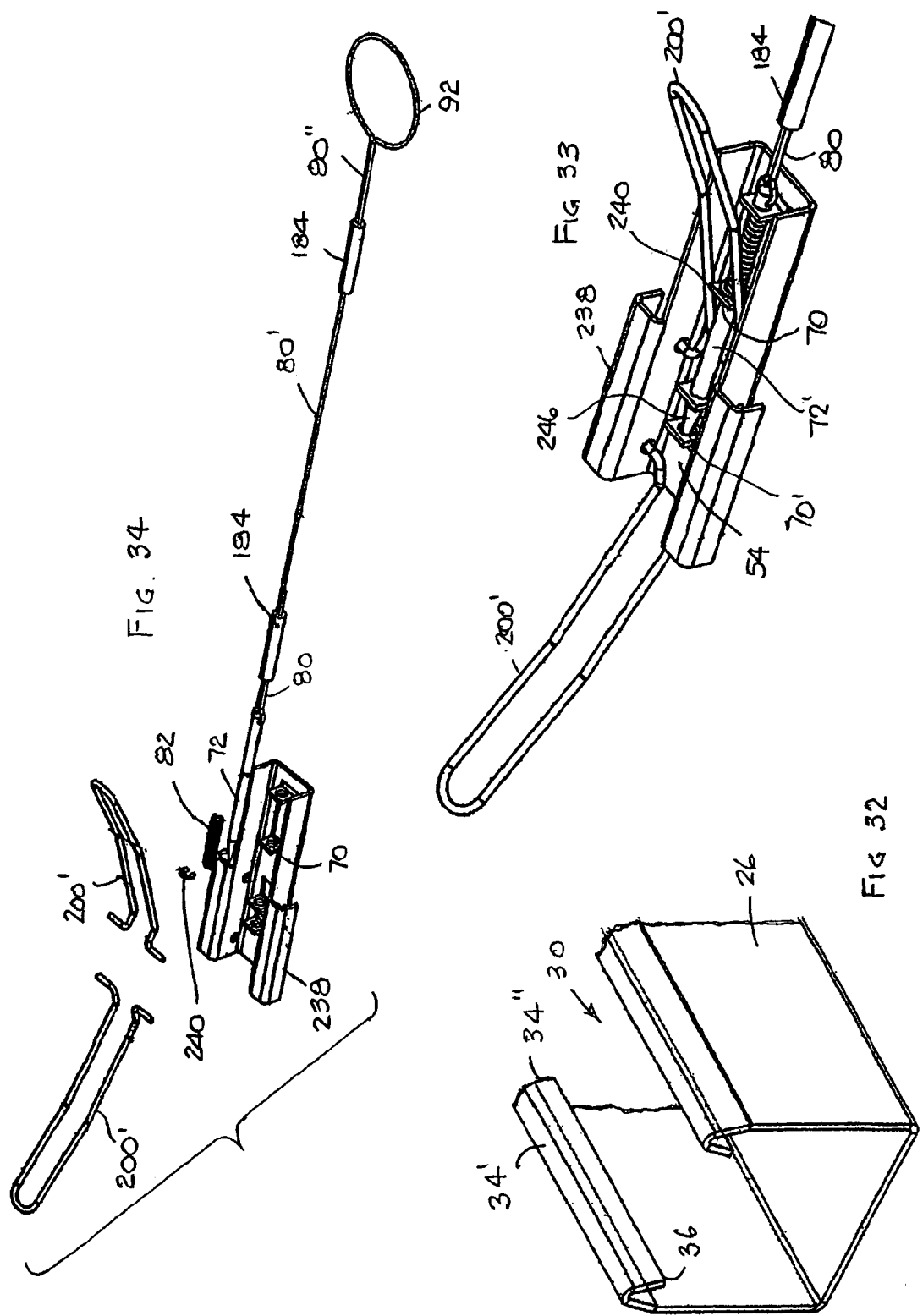

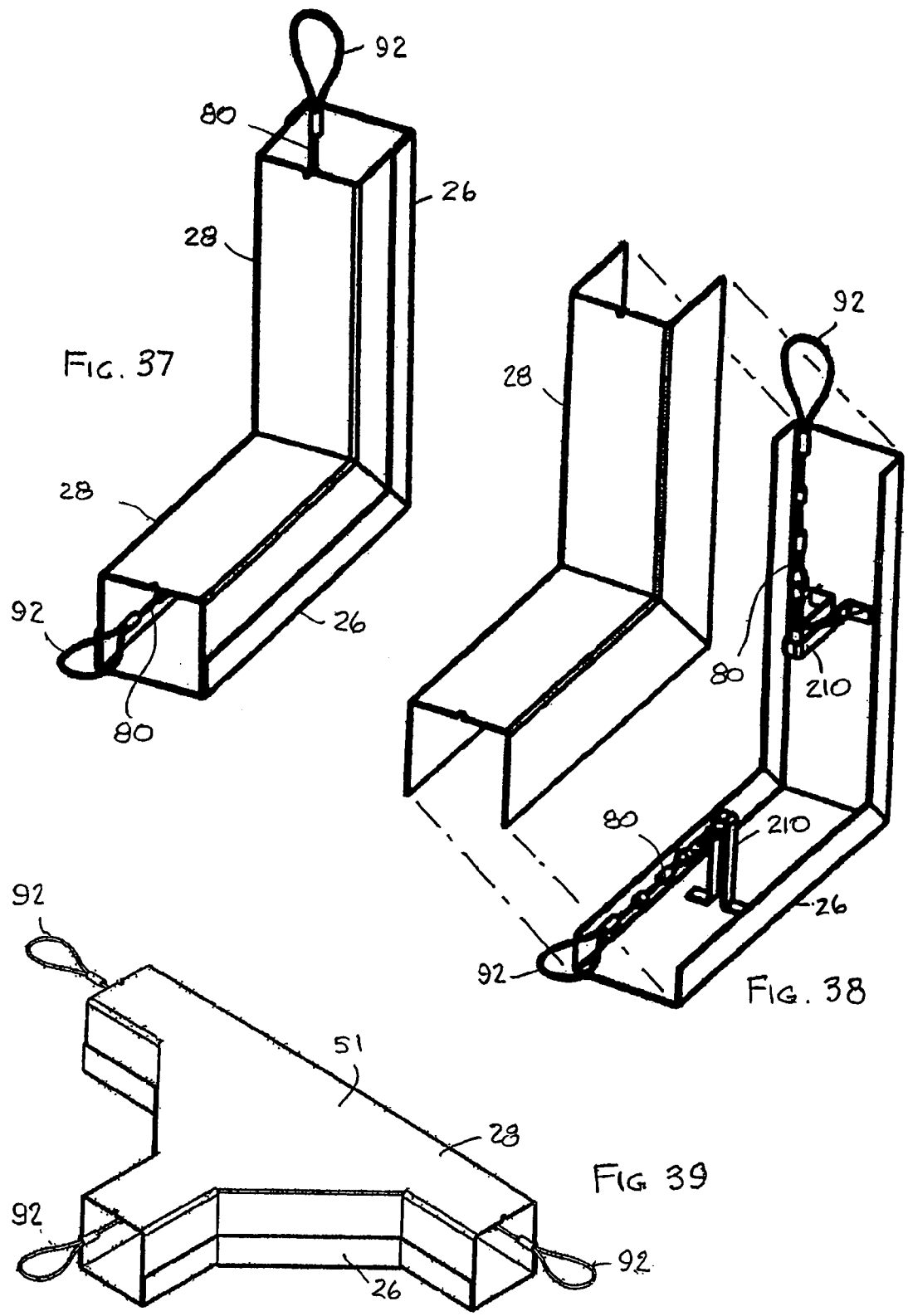

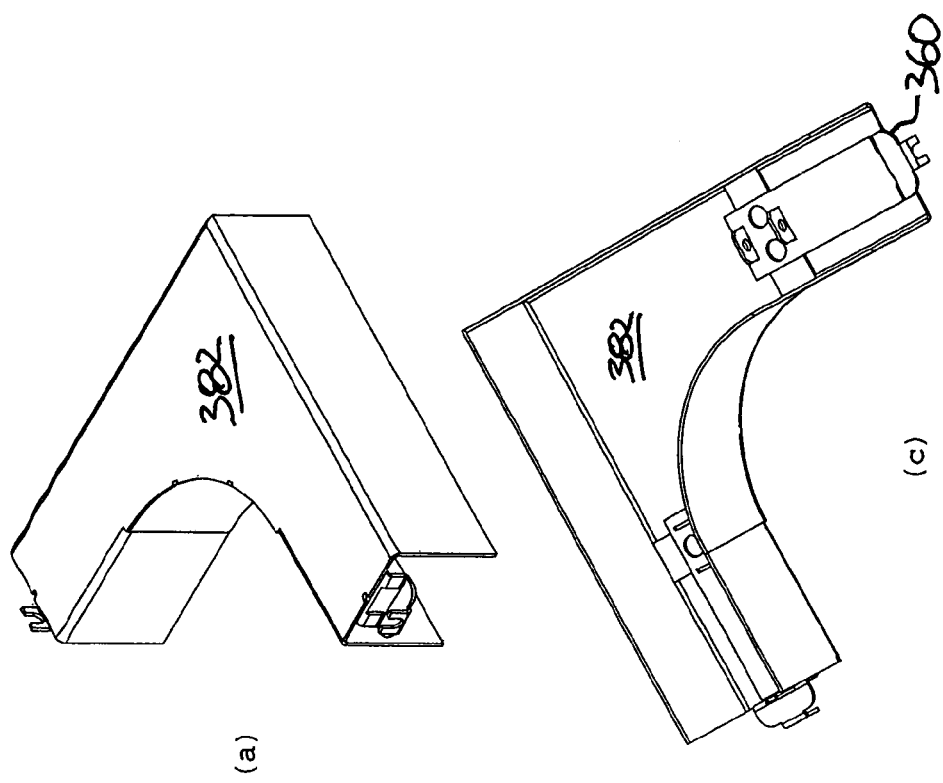
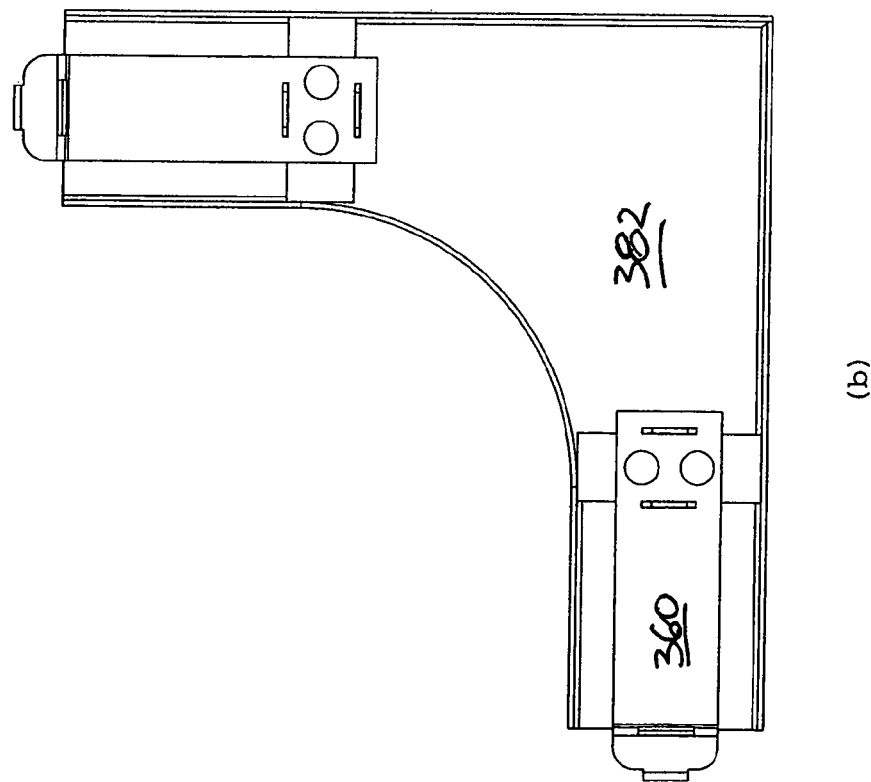
FIG. 52

ELECTROMAGNETICALLY INSULATED CONDUIT AND SYSTEM

CROSS-REFERENCE TO RELATED APPLICATIONS

This application is based upon and claims the benefit of the filing date of U.S. Provisional Patent Application Ser. No. 60/480,726, filed on Jun. 23, 2003.

This application is also a continuation-in-part of U.S. patent application Ser. No. 11/022,557 filed on Dec. 22, 2004, which is a continuation-in-part of U.S. patent application Ser. No. 10/763,732, filed Jan. 23, 2004, which is a continuation-in-part of U.S. patent application Ser. No. 10/690,272, filed on Oct. 21, 2003.

BACKGROUND

The invention relates generally to conduits, raceways and similar devices for routing signaling or transmission apparatus such as cables, tubing and wires (including those composed of either metal or optical fiber) between locations. More particularly, it relates to such devices which must be used for signaling or transmission in a highly secure environment.

In many industries, research facilities and governmental and military facilities there is a need for secure routing of signaling and transmission means such as computer, power, communication and similar cables and wires and fluid conveyance tubing, e.g., gas and liquid pneumatic and hydraulic lines. (For brevity herein such signaling and transmission means will often be exemplified as and referred to collectively as "cable", "cables" or "cabling" unless the context indicates otherwise or specific types of such means are mentioned. It will be recognized, however, that such collective terminology is used for convenience only and is not intended to be limiting.) Further, the terms "conduit" and "conduit system" may be considered synonymous unless the context indicates otherwise.)

Unauthorized access to such cables must be prevented or at least made extremely difficult while yet easy to detect.

Conduits for routing of such cables must be protected from intrusion by penetration or removal of access covers or sections of conduit, and also must provide a suitable degree of physical protection for the transmission devices within the conduit from environmental hazards, weather and climate excesses and accident or attack. However, such protection must not be so cumbersome that authorized access for removal, repair or insertion of the cables within the conduit is made excessively difficult.

Typical uses for the present secure conduit invention will be for computer networks, communication systems, equipment control systems, remote sensing systems and the like. Specific principal uses which may be illustrated as examples are as conduits for telecommunications cables, computer cables, power transmission cables (especially for power to critical operational equipment or facilities) and environmental gas sampler tubing or piping. Users may be companies, research organizations, military units and governmental organizations and agencies. Facilities where secure conduits are desirable include office and laboratory buildings; military camps and bases; ships, dockyards or other marine facilities; airports; prisons; chemical plants and petroleum refineries; factories; banks, exchanges and other financial institutions; and power, gas and water utilities.

In the past, there have been numerous cable and other routing systems, such as those used to route computer, electric power and communications cables and wires to and within offices, especially within a building.

A particularly successful example of such a system is that described and claimed in U.S. Pat. No. 5,831,211, owned by the assignee of the present invention and patent application, Holocom Networks of Carlsbad, Calif., and commercially available under the trademark TOPRUNNER®. A principal limitation of such systems, however, is that they are not secure from intrusion and cannot be made secure without extensive modification. Such modification is impractical in most cases, since the intent of their designers and their users has been to have them readily accessible to facilitate frequent reconfiguration.

Therefore while such non-secure systems do provide functions similar to those of the system of the present invention, i.e., routing of cables, their physical structures and security capabilities are entirely different.

It would therefore be of significant value to have a secure conduit system that would provide security against unauthorized access to cables routed through the system, while at the same time permitting simple and easy access to those cables within the system to authorized persons. The present disclosure answers this and other needs.

SUMMARY

Embodiments described and claimed herein are directed to a conduit comprising an elongate member with an outer surface and an inner surface defining an inner passage for enclosing one or more electrical signal conductors therein, and an electromagnetic shield disposed coaxially with the elongate member to block electromagnetic radiation emitted by the one or more electrical signal conductors.

In another embodiment disclosed herein, a method of forming a conduit comprises selecting an elongate channel with an outer surface and an inner surface defining an inner passage for enclosing one or more electrical signal conductors therein, and disposing an electromagnetic shield coaxially with the elongate channel to block electromagnetic radiation emitted by the one or more electrical signal conductors.

In a further embodiment disclosed herein, a conduit system comprises two conduits, each conduit comprising an elongate member with an outer surface and an inner surface defining an inner passage for enclosing one or more electrical signal conductors therein, and an electromagnetic shield disposed coaxially with the elongate member to block electromagnetic radiation emitted by the one or more electrical signal conductors, the system further comprising a connector for connecting the conduits to form an extended inner passage.

Further embodiments disclosed herein are directed to apparatus for secure routing of signaling or transmission means which comprises an open-sided open-ended elongated channel member through which the means is routed, a cover for closure of the open side of the channel member, a locking device to lock the cover to the channel member or enclosures, the locking device being releasable only from within the channel member; and release means for releasing the locking device and accessible through an open end of the channel member, whereby the cover and the channel member, once locked together, can be separated only by release of the locking device by access through an open end of the conduit, pathway or enclosure. Normally there will be a plurality of channel members aligned end-to-end, each with its own cover. For most of the channel members, the covers will be held on by simple locking tabs which engage projections or ribs within the channel members. After assembly of the latter cover/channel pairs, the remaining cover and channel member will be assembled with the locking device to secure the entire length of the conduit. The conduit preferably terminates at its ends in secure enclosures which limit access to the interior of the conduit to only that which can be gained through the enclosures. Other secure enclosures may be spaced along the length of the conduit.

T-, Y-, L- and X-shaped and other curved, bent, or multibranched raceway/cover pairs can be included in the conduit structure to form branches which allow conduit directional changes, junctions and multiple conduit routes.

In such cases each conduit branch should terminate in a separate secure enclosure, and normally a cover/channel pair with a locking device will be included in each branch, unless the branch is quite short, such that it can be secured by abutting the main secured portion of the conduit.

The signaling or transmission means of significance in this invention includes, but is not limited to, computer, power, communication and similar cables and wires and fluid conveyance tubing, e.g., gas and liquid pneumatic and hydraulic lines. Within the secure conduit of this invention anyone or more of such means may be routed, the number being limited primarily by the physical size of the conduit and by the sharpness of any turns in the conduit. Where a conduit has multiple branches, individual cables may follow different paths through the conduit system, such that different numbers of cables may be present in different branches of the system.

The locking device which permits securing of the cover to the conduit may be secured within the conduit in a variety of manners, such as by use of spring-urged pins engaging projecting ribs on the interior walls of the conduit or by use of bolts which allow clamping of the locking device to both the top of the conduit and to the interior ribs.

BRIEF DESCRIPTION OF THE DRAWINGS

FIG. 1 is a side view of a typical conduit assembly mounted on a wall of a supporting surface;

FIG. 2 is a perspective view of a flange connector;

FIG. 3 is an enlarged sectional view taken on line 3—3 of FIG. 1;

FIG. 4 is a perspective view from above of a locking unit;

FIG. 5 is a perspective view from below of the locking unit of FIG. 4;

FIG. 6 is a perspective view of a section of a raceway;

FIG. 16 is an enlarged sectional view taken on line 16—16 of FIG. 1;

FIG. 17 is an enlarged sectional view taken on line 17—17 of FIG. 16;

FIG. 18 is a perspective view of a corner raceway component;

FIG. 19 is a perspective view from below of a corner top cover;

FIG. 20 is a top view of a T-shaped junction unit;

FIG. 24 is a perspective view of above of another alternative version of the locking unit of FIG. 4;

FIGS. 25 and 26 are respectively perspective views from below of the locking unit of FIG. 24 in an unlocked and locked configuration, illustrating locking and unlocking by spring pins and a U-shaped spring release;

FIGS. 27, 28 and 29 are perspective separated views of the two halves of respectively a T-shaped locking junction unit, an X-shaped locking junction unit and an L-shaped locking corner unit;

FIG. 30 is a plan view from below of the interior of an L-shaped bend unit, similar to the L-shaped corner unit of FIG. 29;

FIGS. 31 and 32 are oblique views of one end of alternative embodiment of raceways of FIG. 6 formed respectively from aluminum and steel FIGS. 33 and 34 are, respectively, an oblique and an exploded oblique view of an alternative embodiment to the release mechanism of FIGS. 25 and 26;

FIGS. 37 and 38 are, respectively, an oblique and an exploded oblique view of an alternative lanyard embodiment to the spring release mechanism of FIGS. 29 and 30 for corner (L-shaped) and angled sections;

FIGS. 39 and 40 are respectively an oblique and top view (with the top cover removed) of a large radius T-junction section of conduit, illustrating a release mechanism equivalent to that of FIGS. 37 and 38;

FIG. 52 depicts perspective and top views of the corner raceway top cover depicted in FIG. 51, with the locking rod guard depicted in FIG. 49, for use with a raceway system according to the present disclosure;

DETAILED DESCRIPTION

Figure 7:
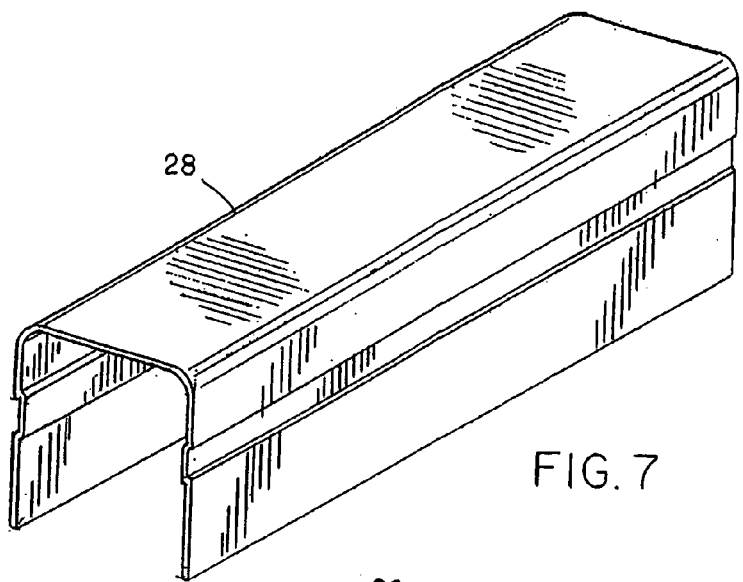
FIG. 7 is a perspective view of a section of a top cover.

For the purposes of this invention, the terms "secure", "secure conduit", "secure conduit system", "secure enclosure" and the like are intended to include those systems which meet the requirements of "Protective Distribution Systems (PDS)" as defined by the National Security Telecommunications and Information Systems Security Secretariat of the National Security Agency in Instruction No. 7003 (NSTISSI 7003: issued 13 Dec. 1996), the content of which is incorporated herein by reference. In addition to those secure conduit systems which are "secure" within the meaning of the PDS requirement, the present invention may also be used for secure conduit systems where the degree of security is not within the specific PDS standard. Such other conduit systems may include various non-governmental and/or commercial systems to which NSTISSI 7003 may not be applicable or where application is voluntary.

It will also be recognized that security of a conduit system is often a function of both the system's resistance to penetration or entry and the ease of an observer's being readily able to tell that penetration or entry has been attempted or accomplished. Thus as will be described the conduits of the present invention are commonly installed with stand-offs or other means to isolate the conduits from contact with adjacent surfaces, such that an observant by sight or touch readily examine all exterior sides of conduit components to detect any attempt at penetration of or entry into the system. Thus where inspection of a system is frequent or the sections of the system are readily in view of observers, such that attempts at penetration or entry will be easily seen, the conduit components themselves for such sections may be formed of materials which are themselves less resistant to penetration that would be called for in sections of the conduit where inspection is less frequent or more difficult to accomplish.

The invention described and claimed herein is a secure conduit system through which electrical, electronic or optical fiber cables, pneumatic tubing, hydraulic tubing or other elongated wiring, cabling or tubing can be routed.

The conduit system can be connected at its various ends to secure enclosures which allow for secure controlled access to the cabling inside the conduit system. Typical uses will be for computer networks, communication systems, power transmission, equipment control systems, remote sensing systems and the like. Principal uses which may be illustrated as examples in electrical, electronic and telecommunications fields include secure routing of power cables, computer cables and communications cables for networked computer systems and wired telecommunications systems. Locations may be within, between or outside buildings. The secure conduit system will also be of importance even with wireless communications systems, such as for security of landline cabling from the generating or receiving equipment to the sending/receiving antennas.

Another example of potential users' systems is a system for remote environmental air, gas or liquid sampling and analysis. In this type of system, a fluid-tight tube, hose or pipe is run from a storage or analysis location to a remote sampling site where the pipe terminates in an open liquid-, air- or gas-sampling device. Periodically or continually samples of the environment at the sampler point are taken, and then transported back through the pipe to a collection system for analysis or directly to an analysis system. Such secured pipe is desired when the liquid, gas or air in the pipe cannot be leaked to the outside or accessed by unauthorized persons or in an unauthorized manner. Such unauthorized access is of particular concern when the liquid, gas or air being sampled is itself flammable, toxic or otherwise dangerous, or when it may be contaminated with or otherwise carry or entrain flammable, toxic or otherwise dangerous components.

It is not intended that the secure conduit itself normally be air-, liquid- or gas-tight, although its closed configuration is such that it can be exposed to inclement environments and will to some extent resist infiltration of rain, snowmelt, blown dust and similar common environmental elements. Should greater environmental protection be desired, it is contemplated that the cabling can be encased in a protective sleeve or similar device prior to being installed within the conduit, or alternatively the conduit itself, after insertion of the cables can be encased in such a protective covering. It will be recognized that reconfiguring of the conduit contents will thereafter normally necessitate removal of some or all of the protective covering.

It will be understood that reference to an embodiment as "alternative" is intended to indicate only that the present invention includes a number of variations of the various embodiments as to structure, materials of construction, number and types of conduit components, and the like. All are considered to be substantially equivalent in overall performance. A user of the invention can readily select the specific combinations of components, materials, etc. which are best suited for the particular location, environment and specified security requirements for the particular system which he or she needs. Numerous examples will be referred to below.

FIG. 1 shows the components of the secure conduit system 2 in a very simplified installation and a wall 4.

Installations will commonly be mounted on walls, ceilings, space dividers, bulkheads, building structural members such as columns, rafters, studs and joists, and other similar supports. They may also span short unsupported spaces (usually not more than 3–10 ft [about 1–3m)) such as running across spaced-apart joists or studs. The raceway may be surface mounted, but for the most security, however, and as required for PDS installations, most or all of the secure conduit will not be surface mounted, but rather will be mounted spaced apart from the surface over which it runs, so stand-offs are needed along the conduit to maintain it in position. This requirement is to insure that observers of the conduit can detect any attempts to penetrate the conduit from its back side, by being able to see any suspicious hole in the surface to which it is mounted or any suspicious device bridging the gap between the surface and the conduit. Over the length of a conduit run, different means of attachment, stand-off and support may be used at different locations.

Prior to installation, one first determines the locations of the various secure enclosures 6 needed along the secure conduit 2 and the desired route of the conduit (including branches thereof) to reach those enclosures. It is not necessary that the route selected be the shortest possible. As noted, there are a number of different uses for the secure conduit which are anticipated to result in different numbers of secure enclosures along the route, with different spacings between adjacent enclosures. Secure enclosures 6 have been produced and sold commercially by the assignee of this patent application and are also the subject of copending U.S. utility patent application Ser. No. 10/112,353, also assigned to the assignee of this application. Essentially each such secure enclosures 6 incorporates a box-like structure which houses a connection to apparatus of a secure signaling or transmission system 2 such as a computer network, communications network or environmental analysis system. To attach to or gain access to the secure system 2, a user must have a device (e.g., a computer) external to the enclosure but which can be connected to the system 2. The enclosure 6 is normally closed by a penetration-resistant door, which if desired may have a back flange to further enhance penetration resistance and which is locked by a secure lock. (Where the system is one which meets the PDS requirements, the lock itself will meet corresponding governmental requirements.)

An authorized user will have a key or combination to the lock and can open the door and access a connection device on the secure system 2 apparatus within the enclosure.

The user then makes the connection with his/her device and proceeds to do whatever is desired during access to the secure system. For instance, a computer user could access a secure database or give operating commands to a piece of equipment which is operated via the secure system or a chemist could take samples of the fluid passing through an environmental sampling tube. Security of the enclosure is assured since the user must keep the door open while having access, so an observer can see the user at work. Normally only a single connection is provided inside each enclosure, so only a single individual can access the system at a time through the enclosure. Further, if the user terminates his/her use of the system but does not close the enclosure after use, that also is observable since the door can be seen to be open and the identity of the user as the person who last accessed the enclosure will be known. While FIG. 1 shows secure enclosures 6 at each end of the conduit 2, it will be recognized that additional secure enclosures may be positioned at points along the length of the conduit 2, such that access may be had to intermediate sections of the contained cables. Thus, for instance, multiple computer access enclosures may be present on a single computer network cable so that multiple computer users can access the computer network, each through his or her individual access enclosure.

Figure 42:
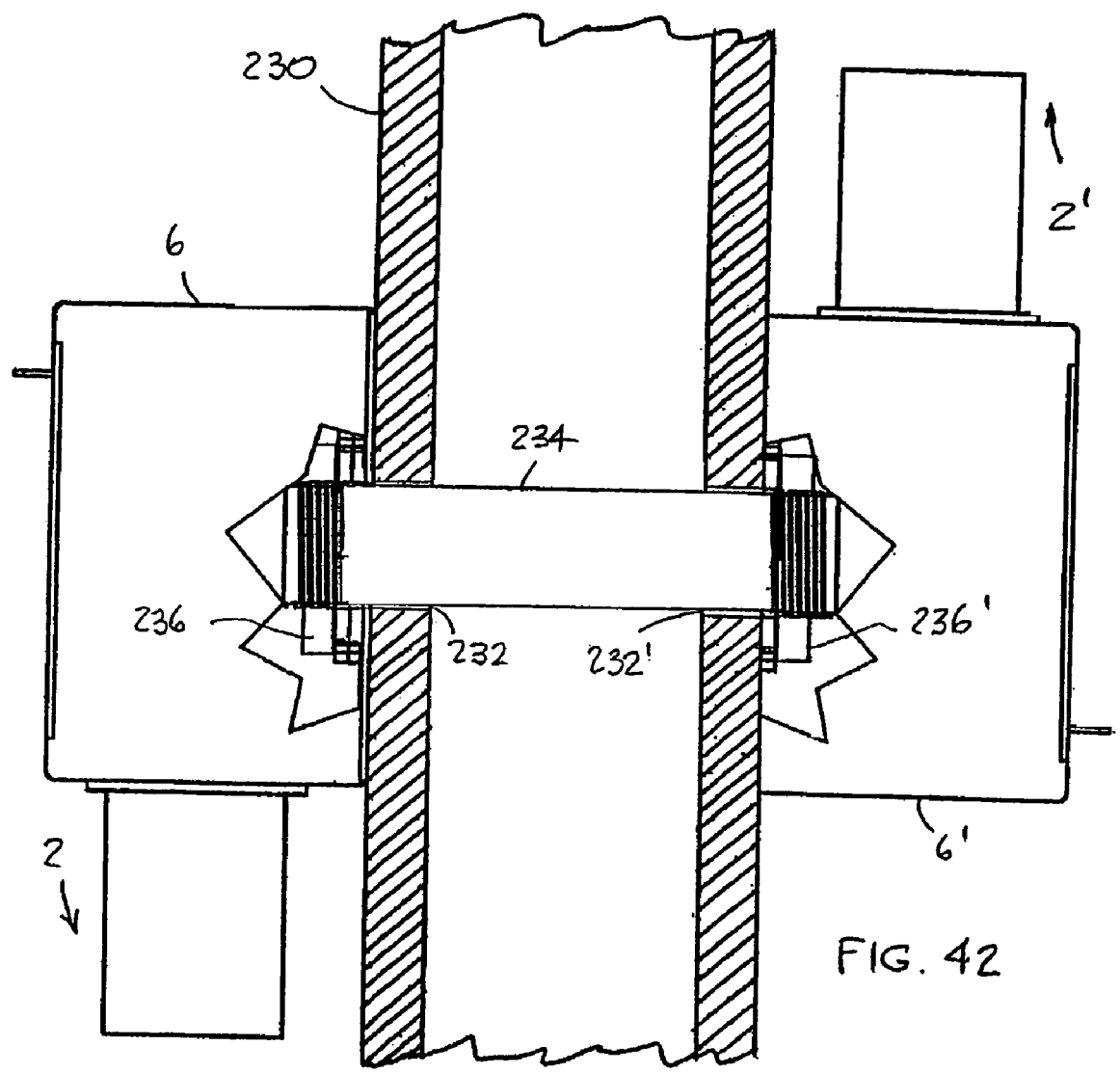
FIG. 42 is an elevation view, partially in cross-section and cut away, illustrating a structure for connection between two secure systems through a barrier wall.

It is also possible to interconnect two physically separate secure systems of this invention. FIG. 42 illustrates such a connection through two secure enclosures 6 and 6' mounted on opposite sides of a barrier wall 230. Corresponding holes 232 and 232' are drilled through the back of each enclosure 6, 6' and through the wall 230 and a short strong pipe or elongated nipple 234, threaded on both ends, is passed through the holes and extended into the interior of each enclosure 6, 6', where it is secured by conventional nuts and washers 236, 236' covering the annular portions of the holes 232, 232', so that external access to the pipe 234 is prevented. Wires, cables, and pneumatic conduits from a secure system 2 of this invention can then be routed through the pipe 234 to a second secure system 2' of this invention without compromising the integrity and security of either system.

The secure conduit system 2 connects to a secure enclosure 6 by means of a flange connector 8, as shown in FIGS. 2 and 3. The wall 10 of enclosure 6 has an aperture 12 (usually circular) through which the circular end extension 14 of the flange connector 8 is inserted.

Extension 14 has external threads 16 which are disposed within the enclosure 6 upon insertion and the connector 8 is secured to the enclosure wall 10 by threading circular nut 18 onto threads 16 until flange 20 of connector 8 abuts the exterior side of wall 10. Extending from flange 20 is connector tube 22 which is hollow with a cross-section (usually square or rectangular) which corresponds similar to the cross-section of the raceway 26 and cover 28. An aperture 24 in flange 20 provides passage for cables from within the enclosure 6 into the connector tube 22 and thus into the conduit system.

A principal component of the system 2 is at least one, and usually many, raceways 26. A raceway 26 can be any convenient length. It is convenient to provide stocks of raceway. 26 in several standard lengths, for example 1, 3, 6 and 10 feet (or metric counterparts of 30 cm and 1, 2 and 3 m). These can be cut to shorter lengths as needed and joined to make longer lengths. Covering the raceways over most of their length are at least one (and also usually many) top covers 28. As best shown in FIGS. 3, 6, 31 and 32, a raceway 26 is an elongated channel member having a generally U-shaped cross-section with an open top 30 and suitable for the routing of cables, wires, tubing and the like. (For purposes of this invention the word "raceway" includes all suitable elongated channel members, regardless of whether they may be referred to by other names in specific industries.) The specific U-shaped cross-section is not critical, as long as it can securely interfit with a corresponding top cover 28. The particular U-shaped cross-section will in many cases be dependent on the type of material from which the raceway 26 (and top cover 28) is made and how it is manufactured. For instance, aluminum raceways may be formed by extrusion, which allows for rounded configurations and internal ribs (see FIGS. 3, 6 and 31) while steel raceways commonly are formed by bending which results in more straight-sided and sharper-edged embodiments (see FIG. 32). In the embodiment of FIGS. 3 and 6, the side walls 32 curve over inwardly at the top to form protruding longitudinal flanges 34. Positioned on the interior of the raceway 26 and disposed parallel to flanges 34 are a pair of longitudinal ribs 36. In the FIG. 31 embodiment, the top portion 34' of flanges 34 is flattened with an inwardly folded end portion 34", and the function of the ribs 36 s performed by the downwardly facing ends 36' of the folded end 34", while in the FIG. 32 embodiment the structure is generally V-shaped with top portion 34' being rounded and the end portions 43" slope inwardly. The bottom of the raceway 26 is usually flat as shown in FIGS. 31 and 32, but may be stepped as shown at 40 to accommodate a gap bridge 42 which connects two raceways abutting at their ends (FIG. 3). One half of the gap bridge is secured to the inside of the bottom of the raceway 26 as by adhesive bonding or spot welding, and then the other half is similarly secured to the abutting raceway 26 to form a firm connection between the two raceways. For most of the raceway elements 26, a closed top cover 28 having a complementary U-shaped cross section and no apertures (see FIG. 7) is used to close the open top 30 of the raceway 26 once the cabling has been inserted. The closed top cover 28 has secured on the inside thereof (as by spot welding) a locking tab 38, which interfits with the ribs 36 and locks the top cover 28 in place.

Figure 8:
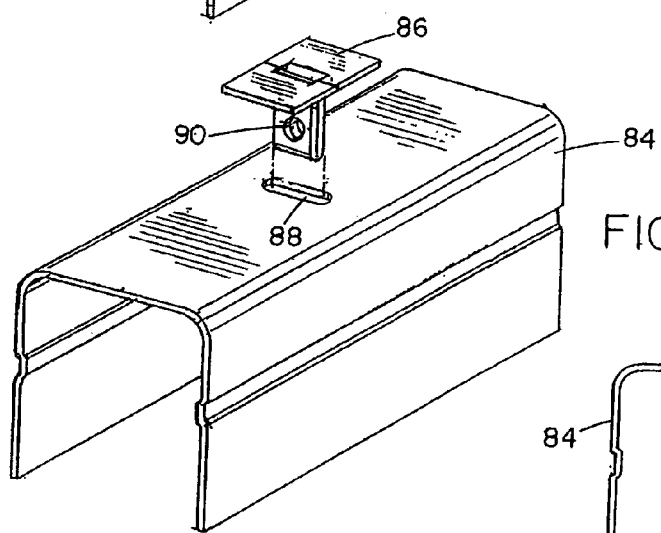
FIG. 8 is a perspective view of a lock connector.
Figure 9:
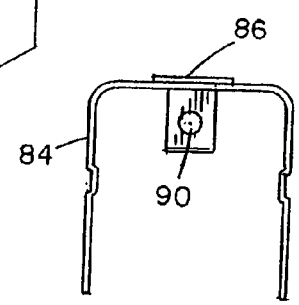
FIG. 9 is an end view of the lock connector of FIG. 8 with the locking tab secured in place.

To start assembly of a secure conduit system 2 a flange connector 8 is first inserted into a secure enclosure 6 and fastened tightly as described above. One end of a first raceway 26 is inserted fully into the connector tube 22, butting up against the portion of flange 20 which surrounds aperture 24. In the embodiment illustrated in FIG. 3, a top cover 28 is then fitted over the raceway 26. This top cover 28 will have an aperture 88 in it as illustrated in FIG. 8, for cooperation with the locking device 52 as will be described below. Connector tube 22 will be sized to accommodate both raceway 26 and top cover 28, so that the leading end of top cover 28 will have its end also abut flange 22 and the entire combination of the raceway 26 and the top cover 28 fill the interior of connector tube 22. At least for the first section of the conduit, the top cover 28 is preferably longer than the raceway 26 so that when the second raceway 26 is attached to the first raceway 26, the first top cover 28 will extend over the exposed end of the first raceway 26 for a short distance to cover the joint between the two raceway elements. A gap bridge 42 will join the two raceways.

Figure 10:
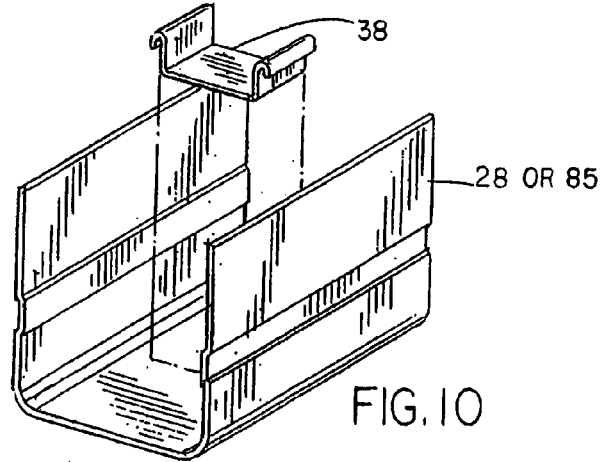
FIG. 10 is a perspective view of a snap-in connector.
Figure 11:
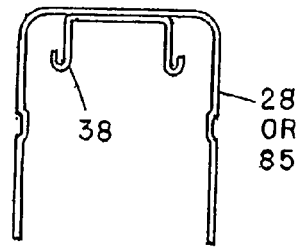
FIG. 11 is an end view of the connector or FIG. 10 with the snap spring secured in place.

Thereafter the second raceway 26 is capped with a top cover 28 which does not have an aperture 88. A locking tab 38 may be positioned in the second top cover 28, as shown in FIGS. 10 and 11, to engage the ribs 36 in the second raceway 26 to secure the second to cover 28. Alternatively, if desired the structure of FIGS. 10 and 11 may be a supplemental cover 85 which can be slip fitted to overlay two abutting top covers 28 and 28' and extend into abutting raceways 26 and 26' to lock the raceways and top covers together through engagement of the tab 38 and thus block penetration or separation of the abutment joint 87, as illustrated in FIGS. 16 and 17. It will be seen that conduits of any desired length can be constructed in this manner by sequential assembly of additional raceways 26 and top covers 28, as desired, either joined directly by tabs 38 or indirectly by supplemental covers 85.

Figure 40:
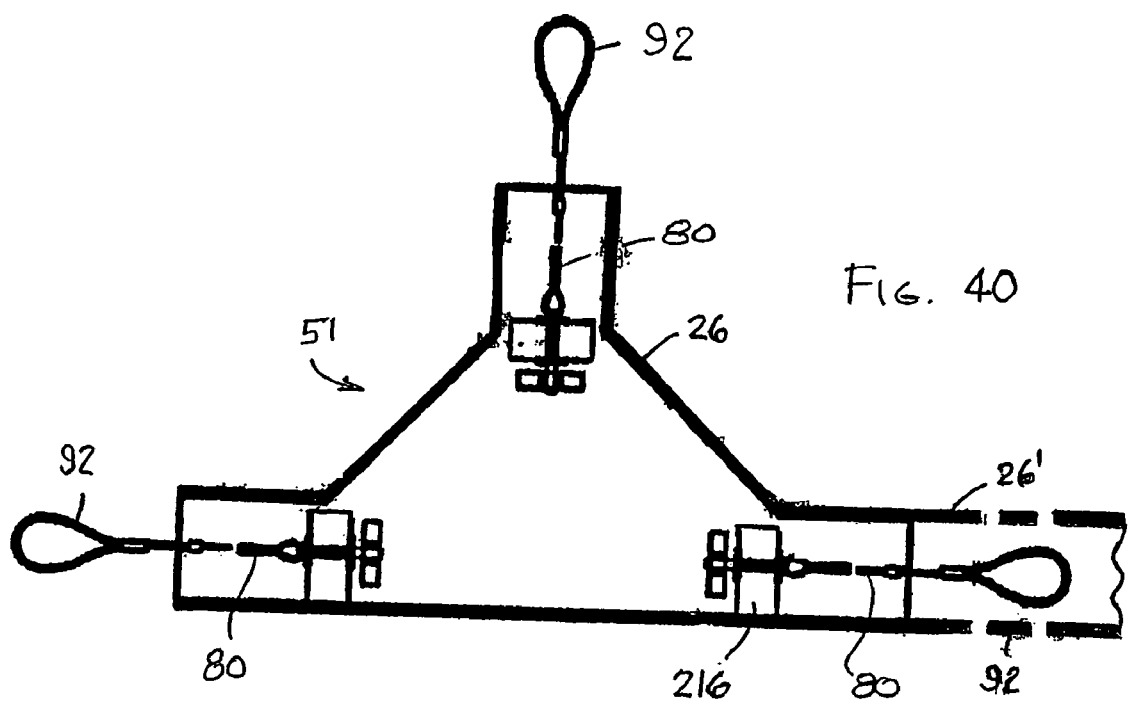

L-shaped corner or elbow raceways 46 (FIG. 18) their top covers 48 (FIG. 19) and corresponding T-, Y- and X-shaped or other multi-armed branching junction raceway units and their corresponding top covers (generally indicated at 50; FIG. 20) may be incorporated as needed to construct the desired overall system configuration. Where larger diameter wires or cables are to be routed within the system 2 or where there are a large. number of wires or cables within the conduit 2, it will be desirable to use broadened configurations of the L-, T-, X-and V-shaped junction units such as illustrated in FIGS. 39, 40 and **41\*51. The broadened configurations allow for larger radius turns of the wires or cables and thus prevent kinking at turns. Some corners and other units may have the raceways and covers secured together by the locking mechanisms described herein which incorporate internal and external elements as illustrated, e.g., in FIGS. 3 and 16. However, alternative configurations of such units with internal locking mechanisms are illustrated in FIGS. 27–30, 38 and 40.' In these alternative configurations the raceway 26 has secured to the middle portion thereto (as by spot welding or strong adhesive) an upwardly extending bar 210 terminated by a barrel 212 disposed parallel to the inner top surface of the top cover 28. The inner top surface of the cover 28 has a corresponding latching member 214 which is configured as one half of a hinge, with knuckles 216 serving as guides for a sliding pin 218 (similar to a hinge pin) with a hooked end 220 to allow for manipulation of the pin 218. In one mode of operation when the raceway 26 and the cover 28 are interfitted, the barrel 212 fits between two of the knuckles 216a and 216b with their respective axes aligned, and the pin 218 can be manually moved from within the interior of the interfitted raceway/cover to a position where it is extended through the barrel 212 and at least the knuckles 216a and 216b in the manner of a hinge pin to lock the raceway 26 and the cover 28 together. While the T-, Y- and X-configured units can operate with only one bar 210/member 214 pair, the L-shaped corners or bends (elbows) will normally require two pairs, one in each leg of the L, unless the L is very shallow (i.e., the bend or elbow encompasses only a small angle). One can optionally put additional pairs in two or more arms of the T-, Y- and X-shaped units to enhance their resistance to unauthorized access. One may also support the pin 218 within the barrel 212 and have it slide into one or more of the knuckles 216 as illustrated in FIGS. 29 and 30**. Other convenient configurations will be evident to those skilled in the art depending on the specific alignments of adjacent parts of the conduit bend, elbow, junction, etc. It will also be evident that once locked together in this manner, the raceway and cover can only be unlocked for separation from within the conduit, thus enhancing security and prevention of unauthorized access for the present system.

The system requires that at least one location a closed top cover will not be used. Rather at this location a locking top cover (described below) will be inserted once the insertion of the cabling is completed and the closed top covers have been placed. In the preferred assembly procedure, at least for a portion of the system the raceways 26 are first placed, including any corner or junction raceways in that portion. Preferably this section will be one which connects to a secure enclosure. The cabling is then laid into the raceways 26 through the openings 30 in their tops and the ends of the cabled passed into the interior of the enclosure. This installation of cabling by simply laying them in the raceways will be recognized to be much easier than having to thread or fish the cables through closed conduits. It may also be desired to lay the cabling throughout the entire conduit system at this time, instead of laying the cabling only for one portion of the system at a time, particularly if the system is fairly short (as for instance within a single room, a suite of rooms or a small building). Once the cables are placed, the top covers 28 can be installed, awaiting the installation of the locking mechanisms to be described below. Where there may be prior non-secure raceways of different cross-section used in the system, one can use raceway covers with modified snap-in connectors configured to connect to the upper parts of those raceways and provide the needed security.

Figure 12:
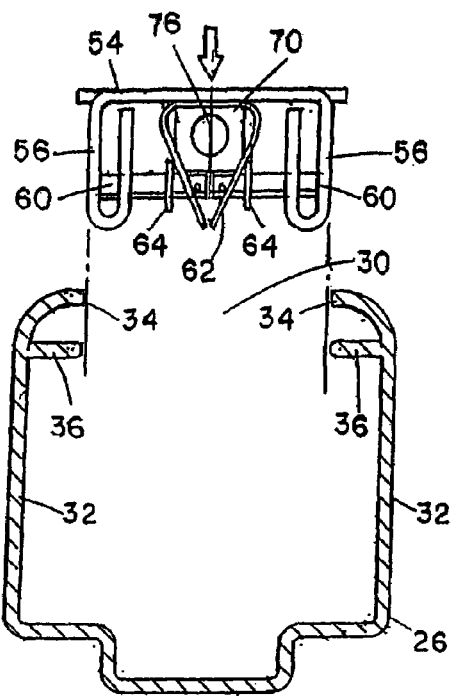
FIG. 12 is an enlarged sectional view taken on line 12—12 of FIG. 6 showing the initial insertion of a locking unit.
Figure 15:
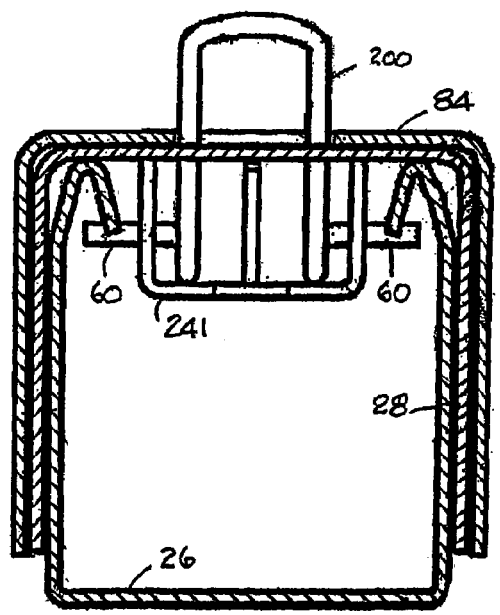
FIG. 15 is a view similar to FIG. 13 illustrating an alternative embodiment.

A critical element of the present invention is the securing locking mechanism used to maintain the integrity of the conduit system while permitting its simple and easy unlocking and disassembly when desired, while yet insuring that the locking system cannot be unlocked or disabled by unauthorized means. This is accomplished by means of locking plate assemblies inserted at the gaps in the top cover installations along the conduit. The top cover mechanism and its installation and operation is best illustrated in FIGS. 3–5, 8–9 and 12–14. (The embodiment illustrated is typical when the components are made of aluminum; FIG. 15 parallels FIG. 13 to briefly illustrate the typical shape differences when the components are made of steel. The minor differences imparted by different materials of construction are discussed further elsewhere herein.) One embodiment of the locking device 52 is shown from above and below in FIGS. 4 and 5, respectively. (Other embodiments will be exemplified below.) It comprises a base plate 54 which has a lateral width W slightly greater than the width of the opening 30 in the raceway 26. The plate 54 also has an aperture 68 and guides 70 (conveniently formed by bending inwardly two tabs formed by cutting aperture 66) in which a longitudinally extending rod 72 is mounted through holes 76. Aperture 68 is positioned such that retracting rod 72 clears its distal end from being beneath aperture 68. Rod 72 has a flange 74 serving as a stop and a hole 78 near one end to which is attached a pull wire 80. A compression spring 82 surrounds the rod 72 and its end distal from the hole 78 is attached to the rod 72. The spring 82 should be of a strength such that when released from compression it readily urges the rod 72 into a locked position as described below, but not so strong that an excessive pull on pull wire 80 must be used to retract it and release locking top cover 84 when access to the interior of the conduit system is desired. Depending from the corners of the plate 54 are U-shaped support brackets 56 with apertures 58 therethrough to guide and support locking pins 60. Wedged between the pair of support brackets 56 at each end of the plate 54 is a spring metal strip 62, preferably made of spring steel. Prior to insertion into the conduit, the strips 62 are compressed inwardly as shown in FIG. 12 and held in that position by pliers handled by the installer. The strips 62 are positioned inwardly of and in contact with flanges 64 on the pins 60. (Other embodiments of securing means will be exemplified below.)

Figure 13:
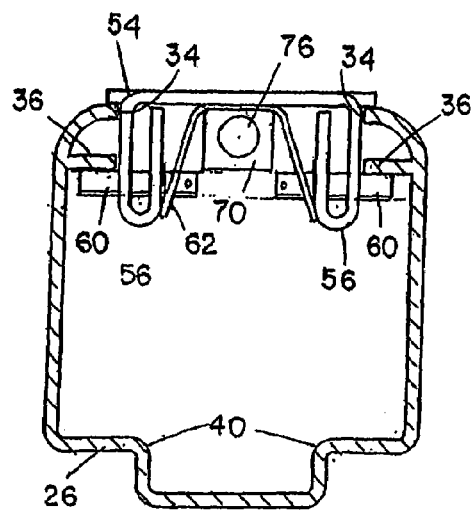
FIG. 13 is a view similar to FIG. 12 showing the locking unit secured in place.
Figure 14:
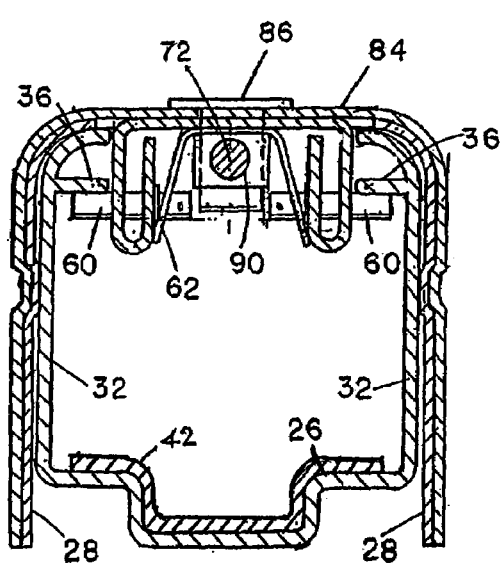
FIG. 14 is an enlarged sectional view taken on line 14—14 of FIG. 3.

The assembly procedure then continues with the installer lowering locking device 52 into an opening 30 in the space left between two closed top covers 30 (FIG. 12) until the base plate 54 rests on the top flanges 34 of the raceway (FIG. 13). The holes 58 in the brackets 56 are now disposed below the ribs 36. The installer then releases the spring metal strips 62 which spring outward in contact with the pin flanges 64, thus moving the pins 60 outwardly and under the ribs 36, thus securing the locking device 52 in place. In each system at least one (and usually most or all) pull wire 80 must be long enough so that it extends to and through aperture 24 in the side of enclosure 6, where it terminates in pull ring 92. Only pull wires 80 which terminate inside a secure enclosure 6 can be operated to initiate opening the system. Then a locking top cover 84 (FIG. 8) is placed over the opening 30 and the locking device 52, so that the ends of the locking top cover 84 overlap onto the ends of the two adjacent closed top covers 28 as shown in FIG. 3, so that the entire length of openings 30 in the raceways 26 is now covered. The locking top cover 84 is placed so that its aperture 88 is aligned with aperture 68 in base plate 54, rod 72 is retracted by an installer pulling on pull ring 92 from within the secure enclosure 6, and a T-shaped locking bracket 86 is inserted through apertures 68 and 88 so that the leg of the bracket 86 with hole 90 projects into the interior of the raceway 26 and hole 90 is aligned with the distal end 74 of rod 72 (FIG. 3). The pull ring 92 is then released and, impelled by compression spring 82, rod 72 is urged forward and its distal end 74 passes through hole 90 in bracket 86, thus locking bracket 86 from upward movement and securing locking top cover 84 in place. All components of the secure conduit system 2 are now interlocked into position with each other and none can be moved or removed until rod 82 is again retracted from hole 90 in bracket 86 by manipulation of the pull ring 92 from within the secure enclosure 6.

With all of the locking plate assemblies in place and their covers locked to them, the conduit assembly is complete.

Figure 21:
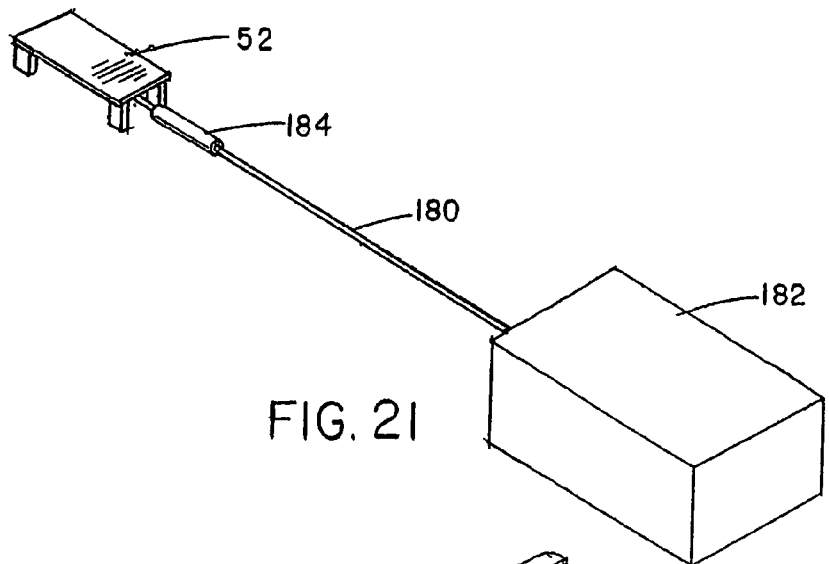
FIG. 21 is a schematic view from above of a mechanized system for locking and unlocking the locking unit.

Alternative structures are contemplated for the locking device 52 and for manipulation of the locking and unlocking mechanism. FIG. 21 illustrates mechanized variations of the pull wire 80 and manual pull ring 92. The housing 182 is contemplated to contain a conventional mechanical or electromechanical actuator, (not shown) such as a servo mechanism, that will reciprocate a linkage 180 which causes the rod 72 to engage or disengage the bracket 86 as described above. Alternatively within the housing 182 could be a pneumatic or hydraulic actuator cooperating with linkage 180 (in this case in the form of a fluid-filled tube, which acts through a pressure-to-mechanical coupler 184 to engage or disengage the bracket 86 as described.

Housing 182 will also contain means, preferably activatable from outside the housing, to start the actuator. The source of electrical, pneumatic or hydraulic power to move the actuator may be internal or external to the housing but should be internal to the secure enclosure 6. Batteries or pressurized reservoirs of gas or liquid may be maintained within the enclosure 6. If the source of the electricity, gas or liquid is outside the enclosure 6, then it must be provided access to the enclosure 6 in a secure manner consistent with the overall security of the enclosure and the conduit system.

Figure 22:
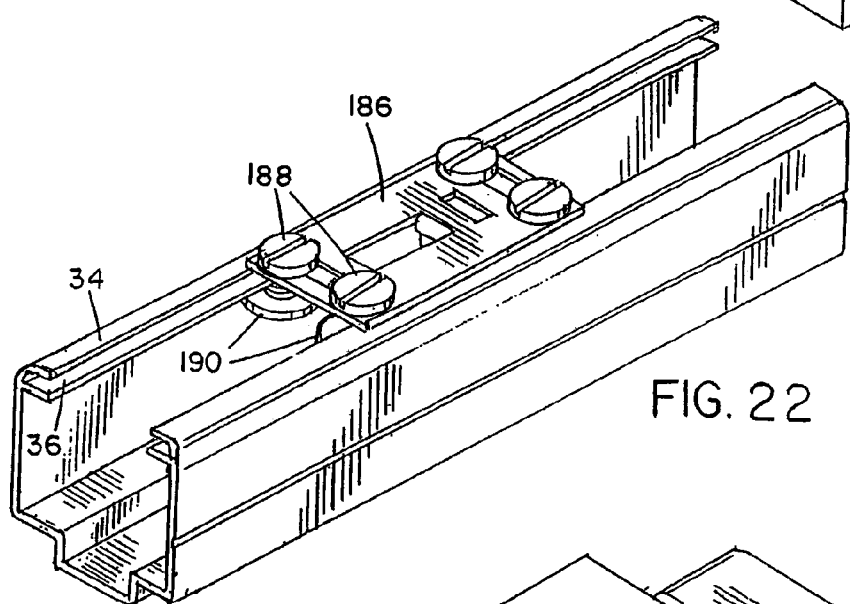
FIG. 22 is a perspective view from above of yet another alternative version of the locking unit of FIG. 4 illustrating a different structure for securing the locking unit in place.
Figure 23:
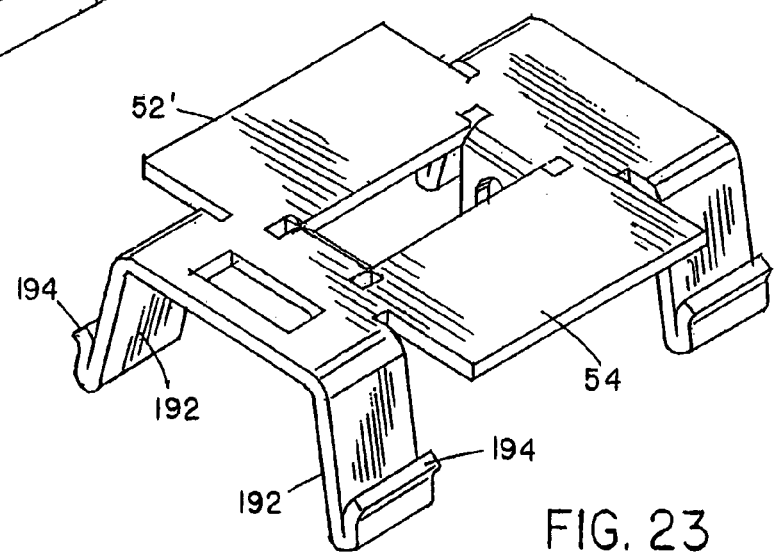
FIG. 23 is a perspective view from above of an alternative version of the locking unit of FIG. 4.
Figure 27:
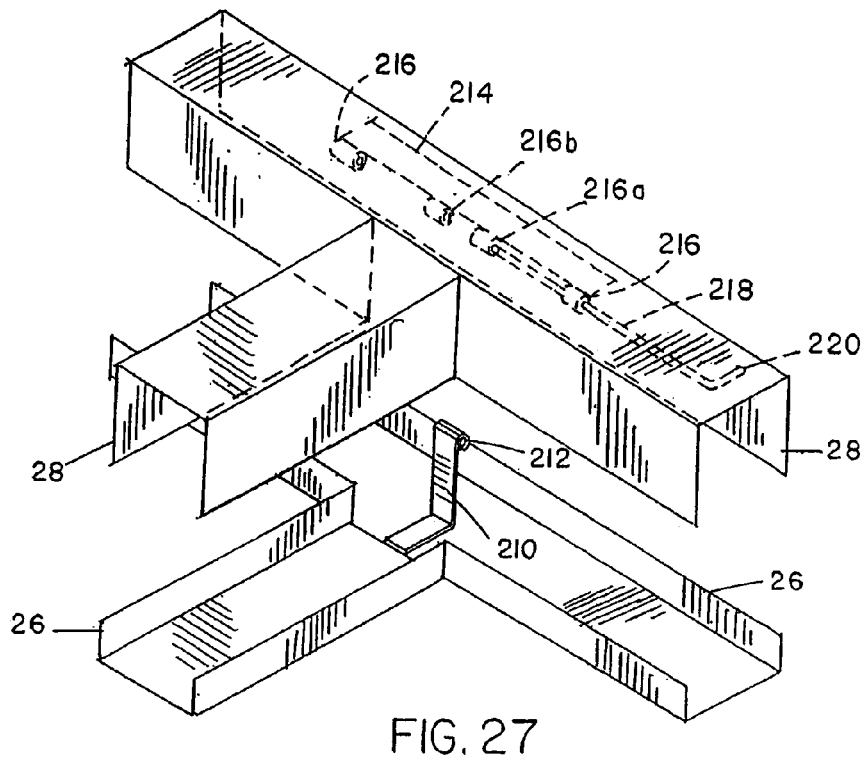
Figure 28:
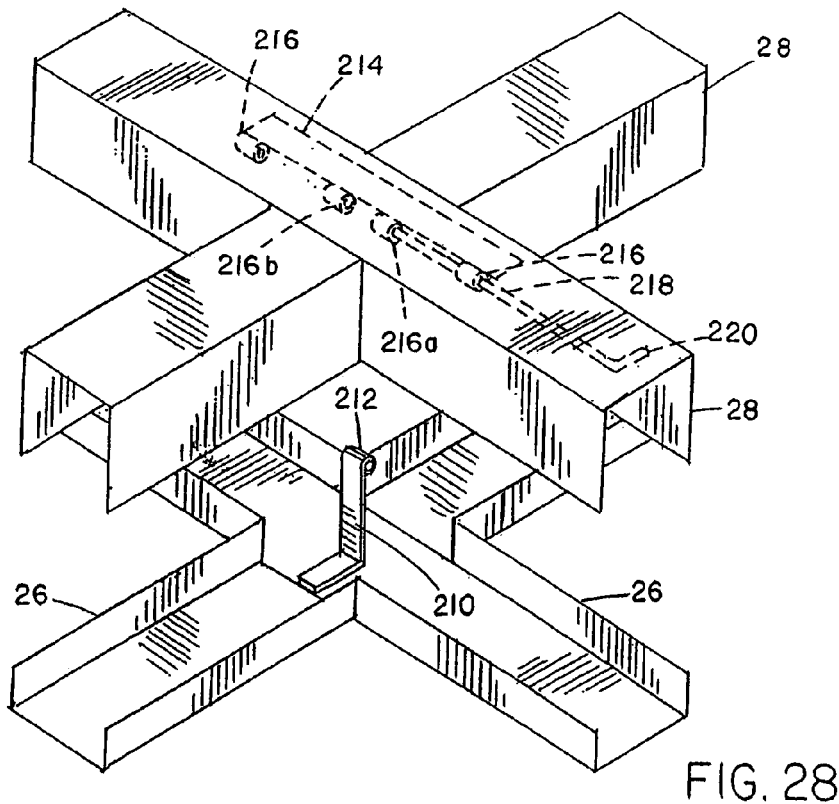

Further, the locking device 52 may alternatively be mounted as shown for comparable device 186 in FIG. 22, with the device 186 having a flat configuration with mounting bolts 188 the ends of which engage respectively flanges 34 and ribs 36 and which are thereafter tightened to secure the device 186 in place. In a further alternative illustrated in FIG. 23, the locking device 52 (here identified as 52') has slanted legs 192 projecting downwardly from the base plate 54 and terminating in hooked portions 194. When the device 52' is inserted into the opening 30 of raceway 26, the base plate 54 is seated against the top of raceway 26 as described above. However, in this embodiment the legs 192, which are slightly flexible, are forced into contact with the ribs 36 and each projecting hooked portion 194 flexes to slide below the underside of a rib 36 and then resiles to snap outwardly into locking engagement with the underside of the rib 34, thus securing the device 52' in place without the need for cooperating pins 60 or springs 62. In another alternative shown in FIGS. 24–26, device 52 (identified as 52") has rigid straight legs 196 with holes 198. When the bracket 52" is seated on the raceway 26, the legs 196 project through the opening 30 and the holes 198 are aligned with the underside of ribs 34. Spring pins 200, which are generally U-shaped devices with angled pin projection 202 are the ends of the legs of the U-shape, are then flexed closed (as illustrated in FIG. 25) and positioned manually to align the ends of projections 202 with the holes 198.

Each spring pin 200 is then allowed to resile open allowing the projections 202 to pass through the holes 198 (as illustrated in FIG. 26) and engage the undersides of ribs 34 and lock the device 52" in place. This configuration can be readily unlocked by manually compressing the spring pins 200 to withdraw the projections 202 from the holes 198, thus releasing the locking device 52".

Figure 35:
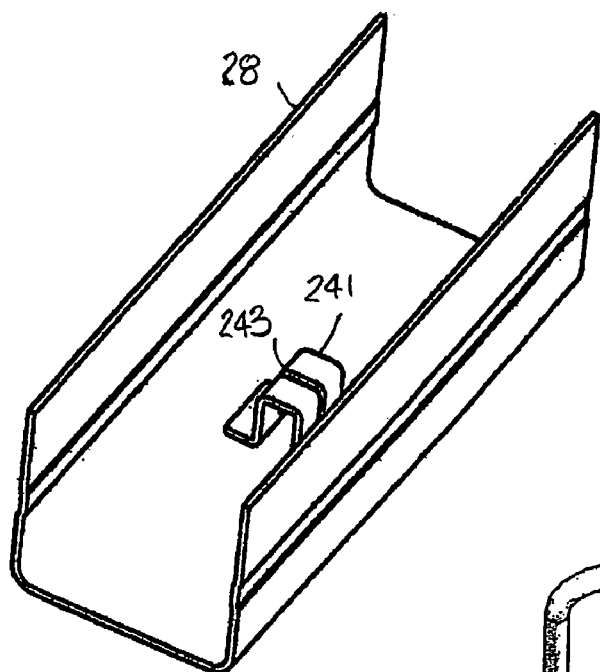
FIG. 35 is an oblique view from below of a top cover illustrating an alternative means of locking the top cover in place.
Figure 36:
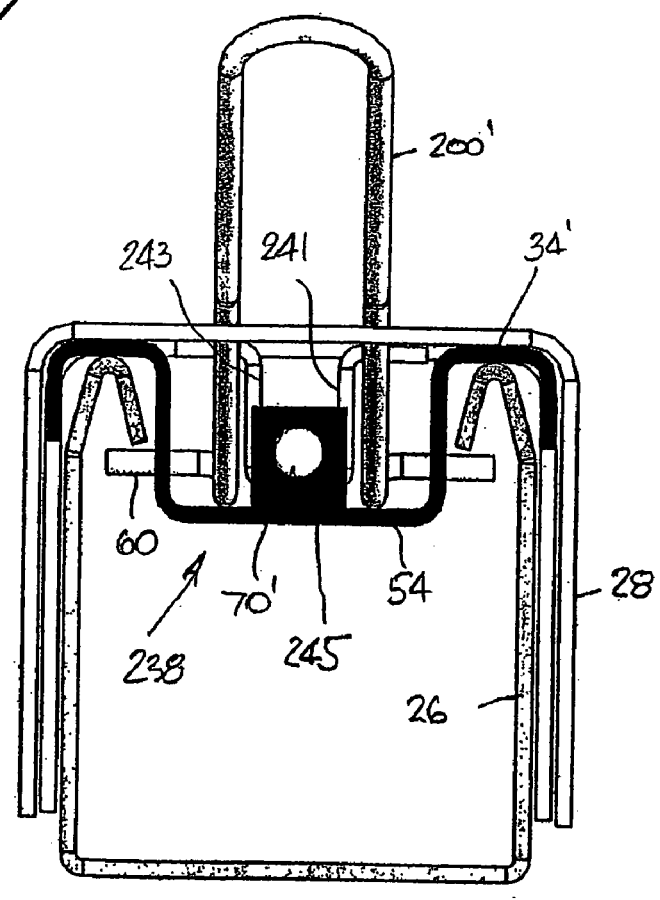
FIG. 36 is an end view of an assembled raceway, top cover and locking mechanism of FIGS. 34–36, with the locking rod removed for clarity.
Figure 41:
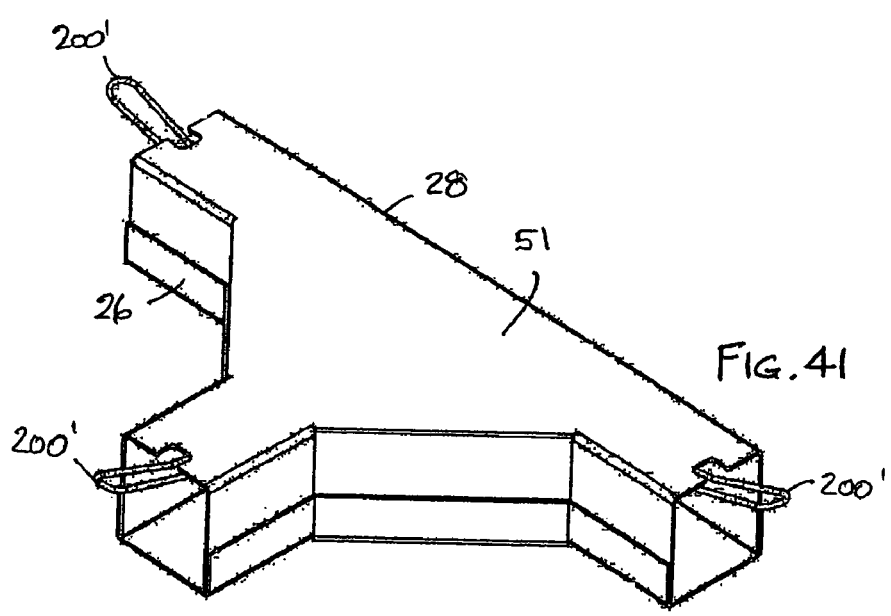
FIG. 41 is an oblique view similar to that of FIG. 39 but illustrating an embodiment where locking release is by spring mechanism rather than by lanyard release.

The system can have many other alternative embodiments which will be evident to the person skilled in the art. In FIGS. 33–35 an alternative locking device 238 is shown, which as compared to locking device 52 is configured to simply be seated over the folded top 34' of flanges 34 of the raceway 26. The curved or bent shape of spring pins 200', as compared to pins 200, facilitates their being locked in place when the conduits are closed since the contact with the underside of the covers 84 urges the pins 200' down against the base plate 54'. The top 28 has on the underside a U-shaped bracket 241 which has a lateral slot 243 through it. When the locking mechanism 238 is placed in the raceway 26 and the top cover 28 placed over it, the tab 245 with hole 70' therein fits into the slot 243. When the lanyard or pull cord 80 is pulled to release the rod 72', spring 82 urges the rod 72' forward through hole 70' and. tab 245 and bracket 241 are locked together. The rod 72' is has a pointed end 246 to facilitate alignment of the rod in its guide holes 70 and 70'. Once locked with rod 72' and with tab 245 seated in slot 243, the section of the conduit is locked against motion in all three axes. The lanyard or pull wire 80 can be extended for multiple lengths such as 80' and 80" by use of connectors 184. FIGS. 37–40 illustrate two versions of a multiple locking embodiment for elbow (L) sections and intersection (T, X and Y) sections, in which there are lanyard- or spring pins-operated locking mechanisms in more than one, and preferably all, of the branches of a multipath section. The enhances the security of the system, as no one can release the cover 28 of a section by manipulating only one lanyard or pull wire 80 or one spring pin device 200 or 200'. If lanyards are used they can be made long enough to reach to the nearest secure enclosures 6 of the system if desired. Preferably however they will reach only into the next section (as shown in phantom as 26' in FIG. 40), as do the spring pin devices 200' (FIG. 41). The multipath section therefore cannot be opened until the adjacent sections have been opened and the lanyards 80 or spring pin devices 200' for the L, T, X or Y section are accessed. The other sections in turn cannot be opened until the initial section is opened by manipulation of a lanyard or pull wire 80 which extends into a secure enclosure 6 as described above.

Figure 43:
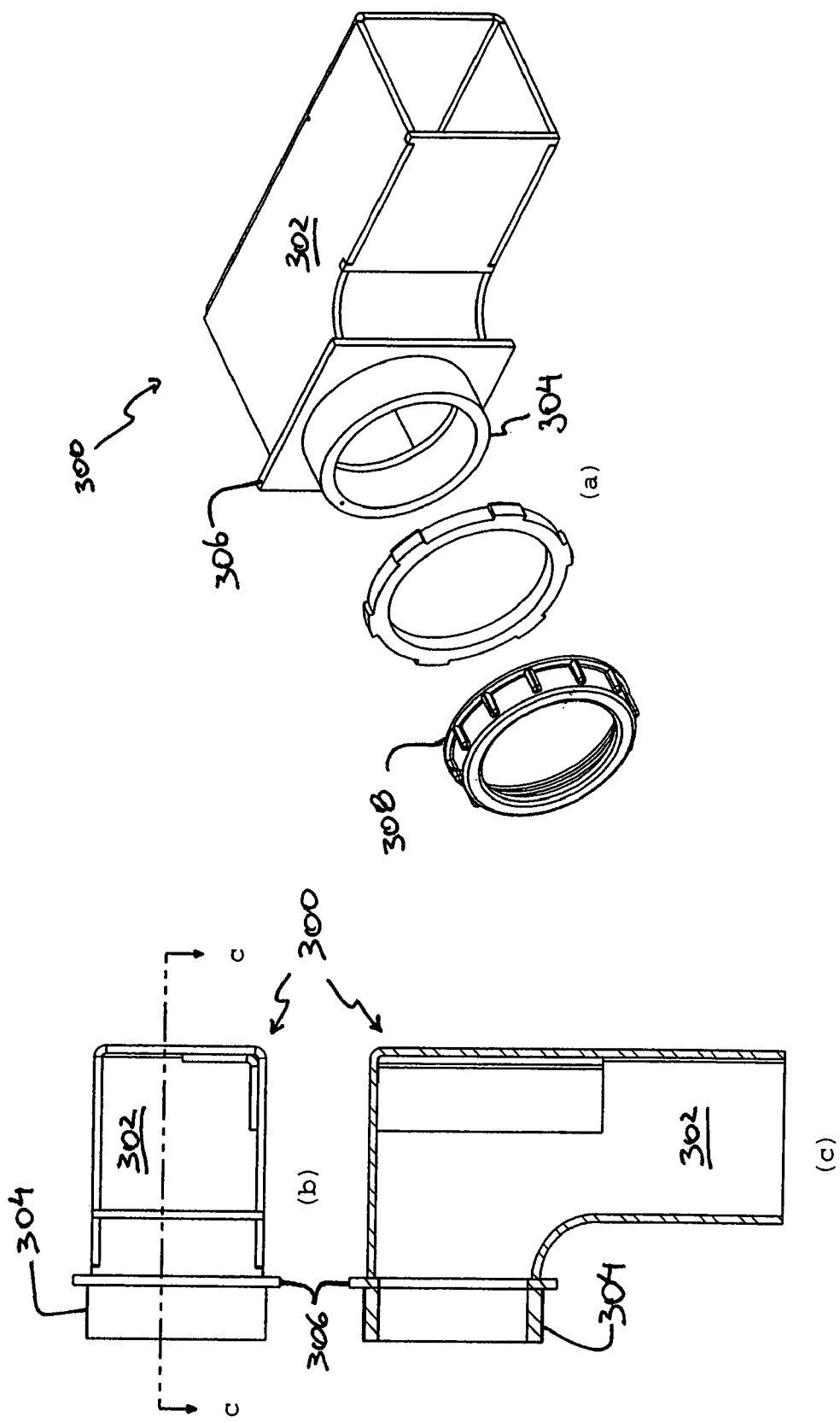
FIG. 43 depicts perspective, top and side views of another embodiment of a flange connector for use with a raceway system according to the present disclosure.

With reference to FIG. 43, another embodiment of a flange connector 300 for use with a raceway system according to the present disclosure is formed with a generally L-shaped body 302. The corner may be formed at any angle, and is depicted as a right (90°) angle only as an example. The inner corner may be formed with a curved wall, as shown in the figure, to accommodate cables and other conduits disposed within. Similar to the flange connector 8 of FIG. 2, the L-shaped flange connector 300 includes an extension 304 with external threads (not shown) that is sized to be received within an enclosure 6, and a flange 306 to about against the exterior wall 10. The flange connector 300 is secured to the enclosure by circular nut 308.

Figure 44:
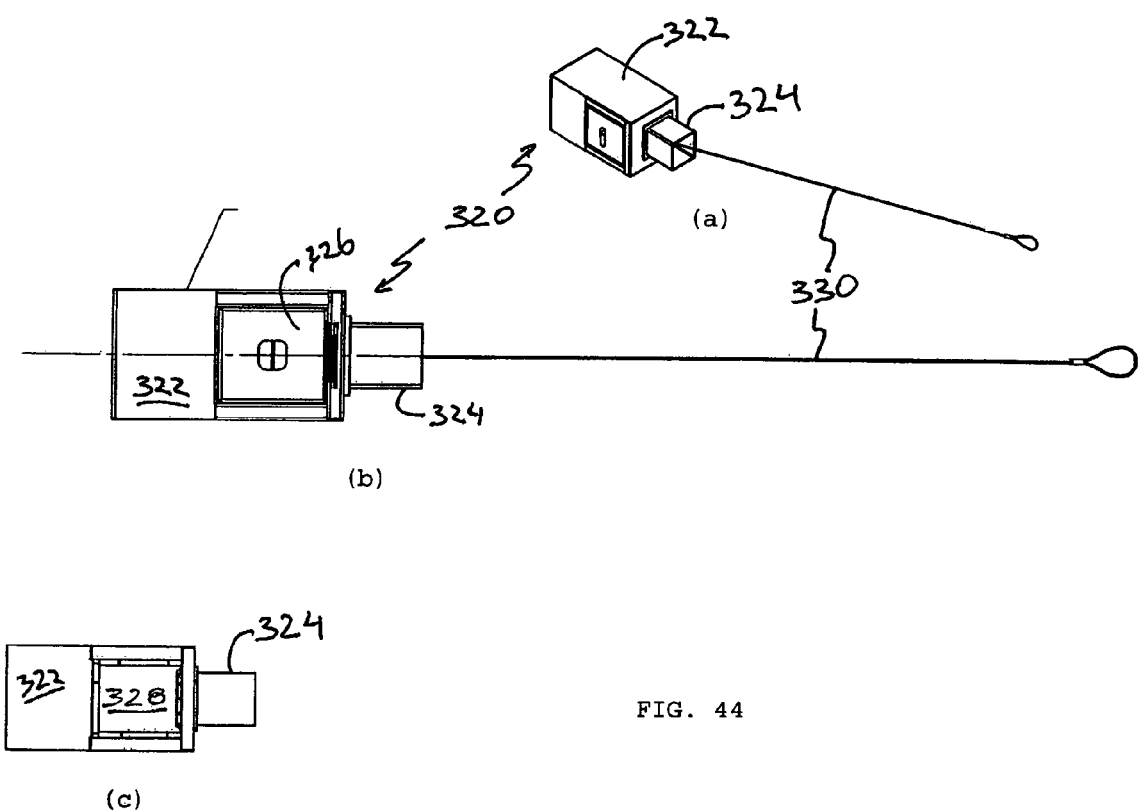
FIG. 44 depicts perspective, top and side views of another embodiment of a universal connector for use with a raceway system according to the present disclosure.

With reference to FIG. 44, another embodiment of a universal connector 320 for use with a raceway system according to the present disclosure. The universal connector is formed with a rectangular body 322 and a rectangular extension 324 that is sized to be received within a raceway (e.g. raceway 26) as described elsewhere herein. The body 322 is formed with an opening 328 in which a door 326 is hingedly disposed. A one-way slam lock or bolt (not shown) may be installed on the inside of door such that it may only be operated (to be opened) from inside the body 322, such as by a pull wire 330.

Figure 45:
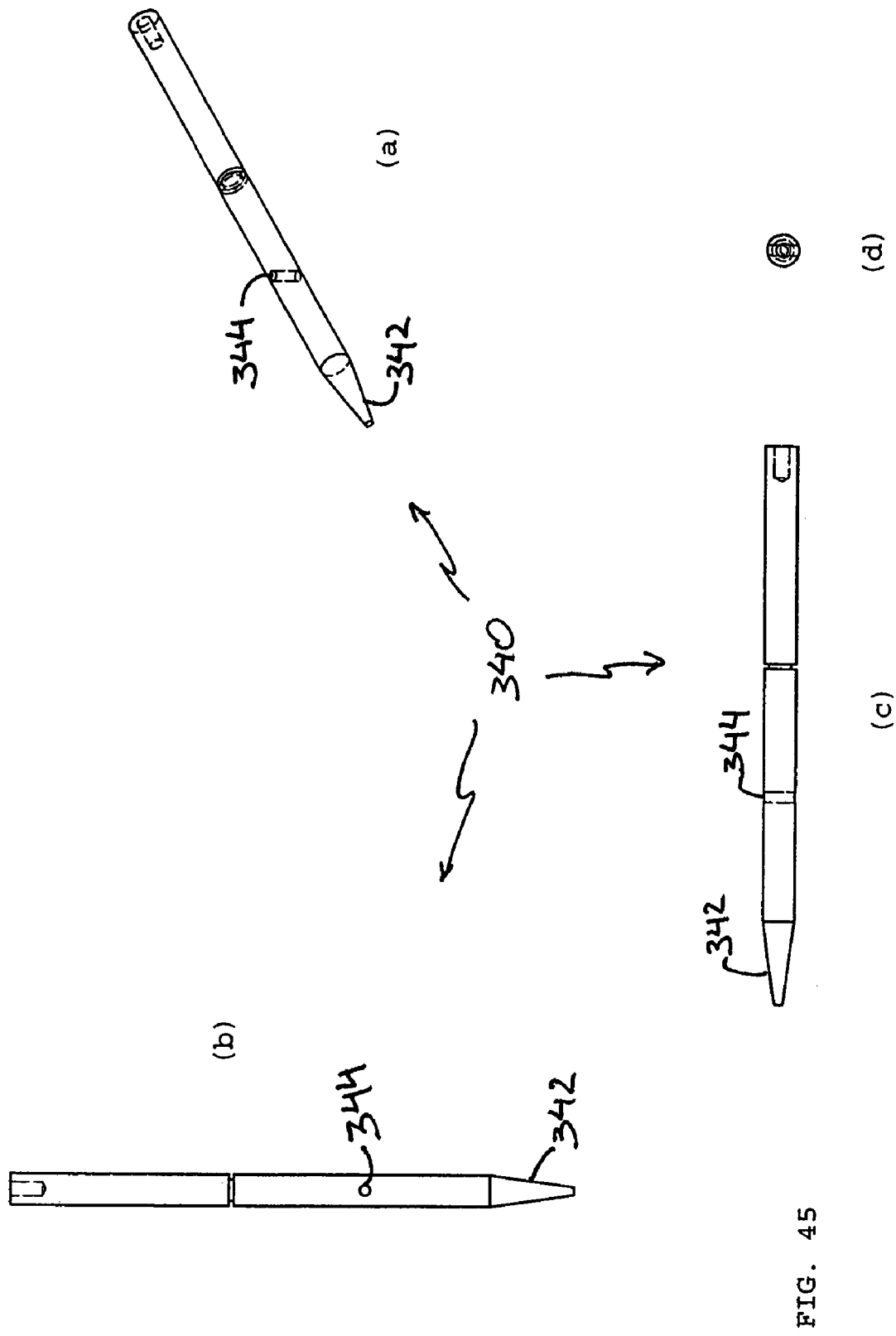
FIG. 45 depicts perspective, top, side and front views of another embodiment of a locking rod for use with a raceway system according to the present disclosure.
Figure 46:
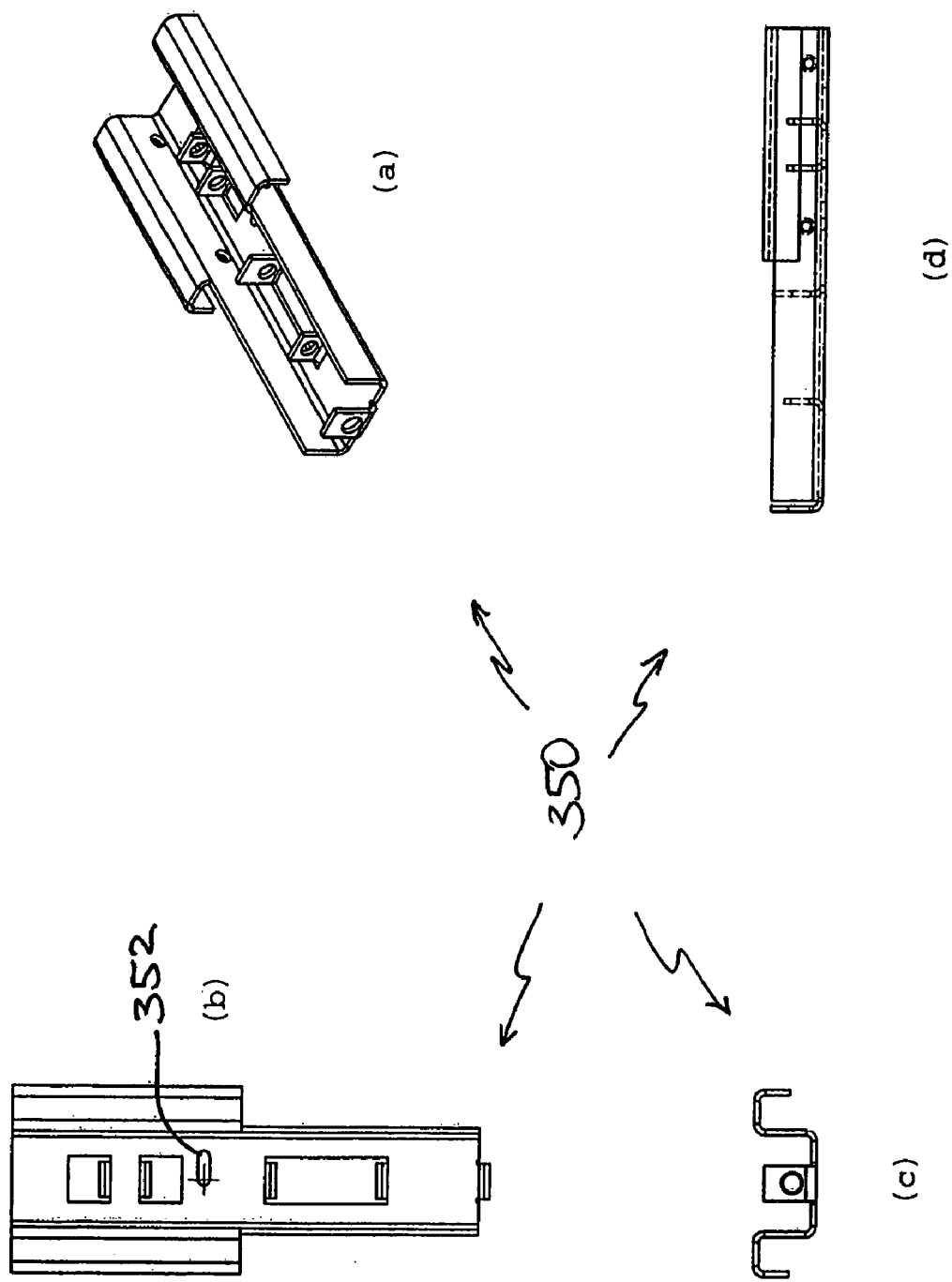
FIG. 46 depicts perspective, top, side and front views of another embodiment of a locking device body for use with a raceway system according to the present disclosure.
Figure 47:
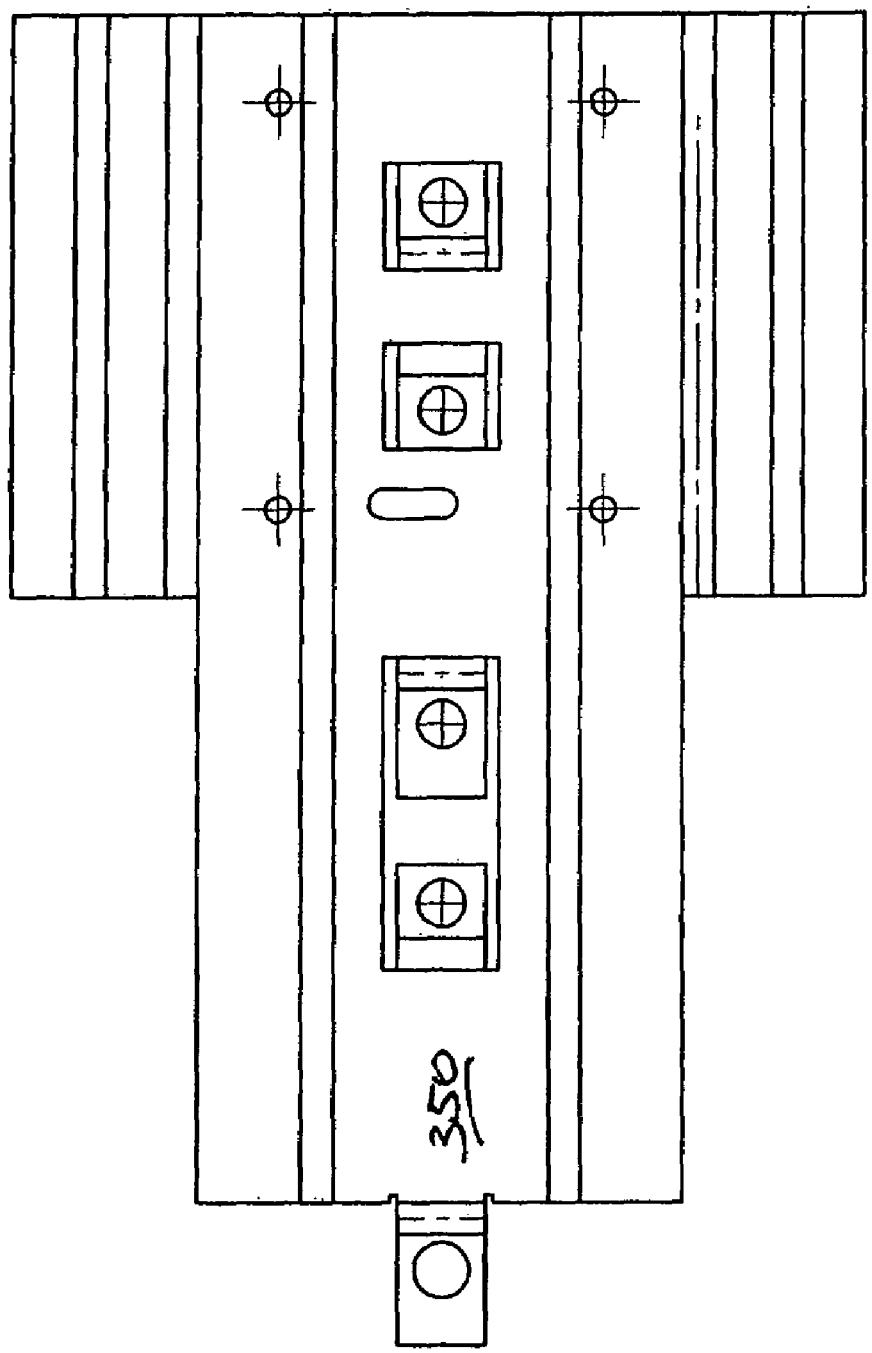
FIG. 47 depicts a top view of a sheet metal cutout to form the locking device body depicted in FIG. 46.
Figure 55:
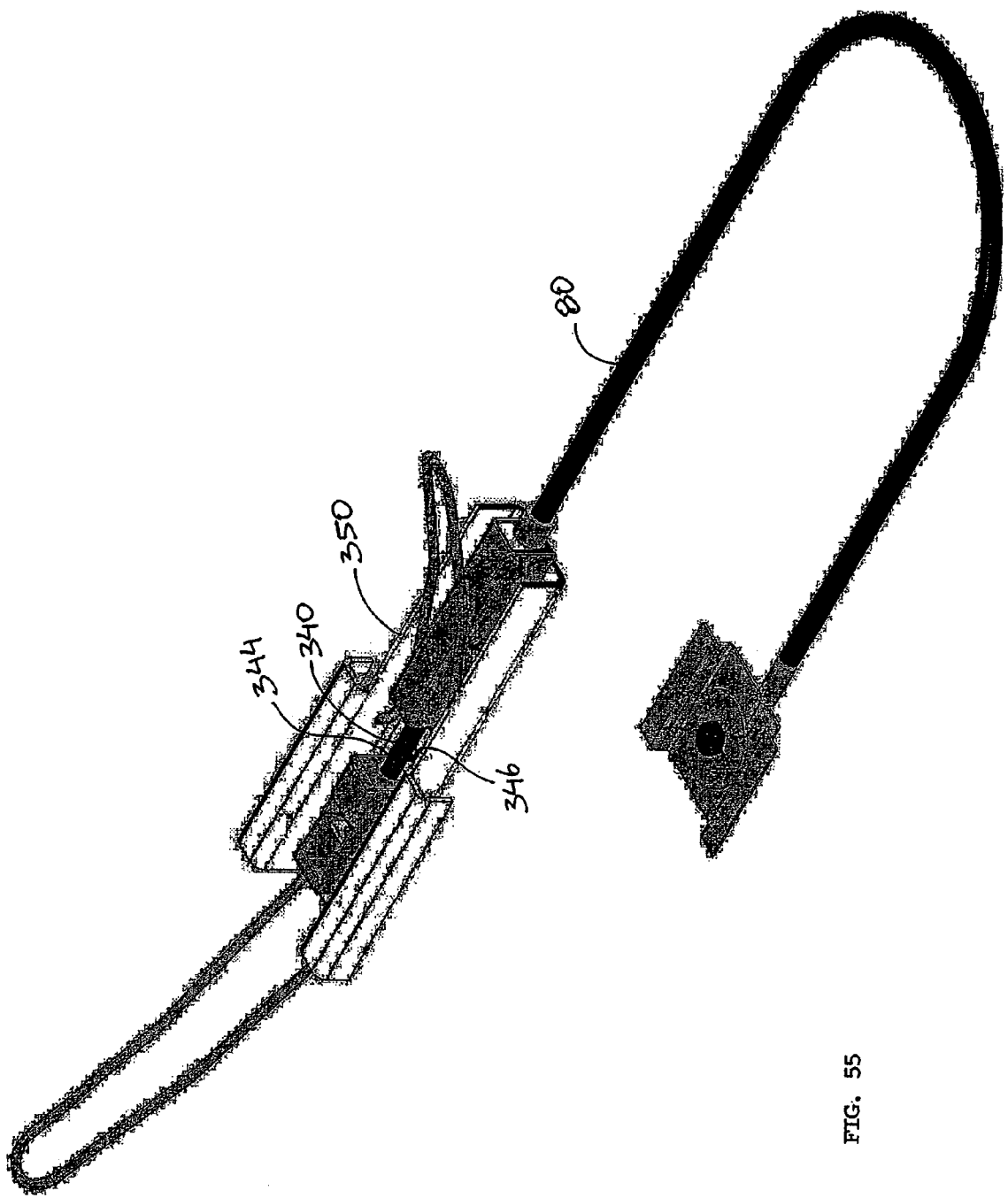
FIG. 55 depicts a perspective view of an assembly of the locking rod of FIG. 45 and locking device of FIG. 46 in accordance with the present disclosure.

With reference to FIG. 45, another embodiment of a locking rod 340 for use with locking devices as disclosed elsewhere herein includes a cross-drilled passage 344 extending across the width of the rod 340, and may further be formed with a tapered front end 342. A pin 346 (shown in FIG. 55) may be sized to fit in the passage 344 and to extend out of the rod. A recess 352 in the locking device 350 (shown in FIG. 46) may be sized to accommodate the end of the pin that extends from the rod 340 such that the rod may not be retracted from the locking device while the pin is in the recess, and such that the rod may only be retracted upon rotation of the rod 340 around its axis so that the pin end is moved out of the recess. The locking device 350 may be formed from a sheet of material (such as a metal) cut and bent as shown in FIG. 47. FIG. 55 depicts an assembly of locking rod 340 and locking device 350 together with a pull wire 80 connected to the locking rod for remote extraction thereof from within the locking device.

Figure 48:
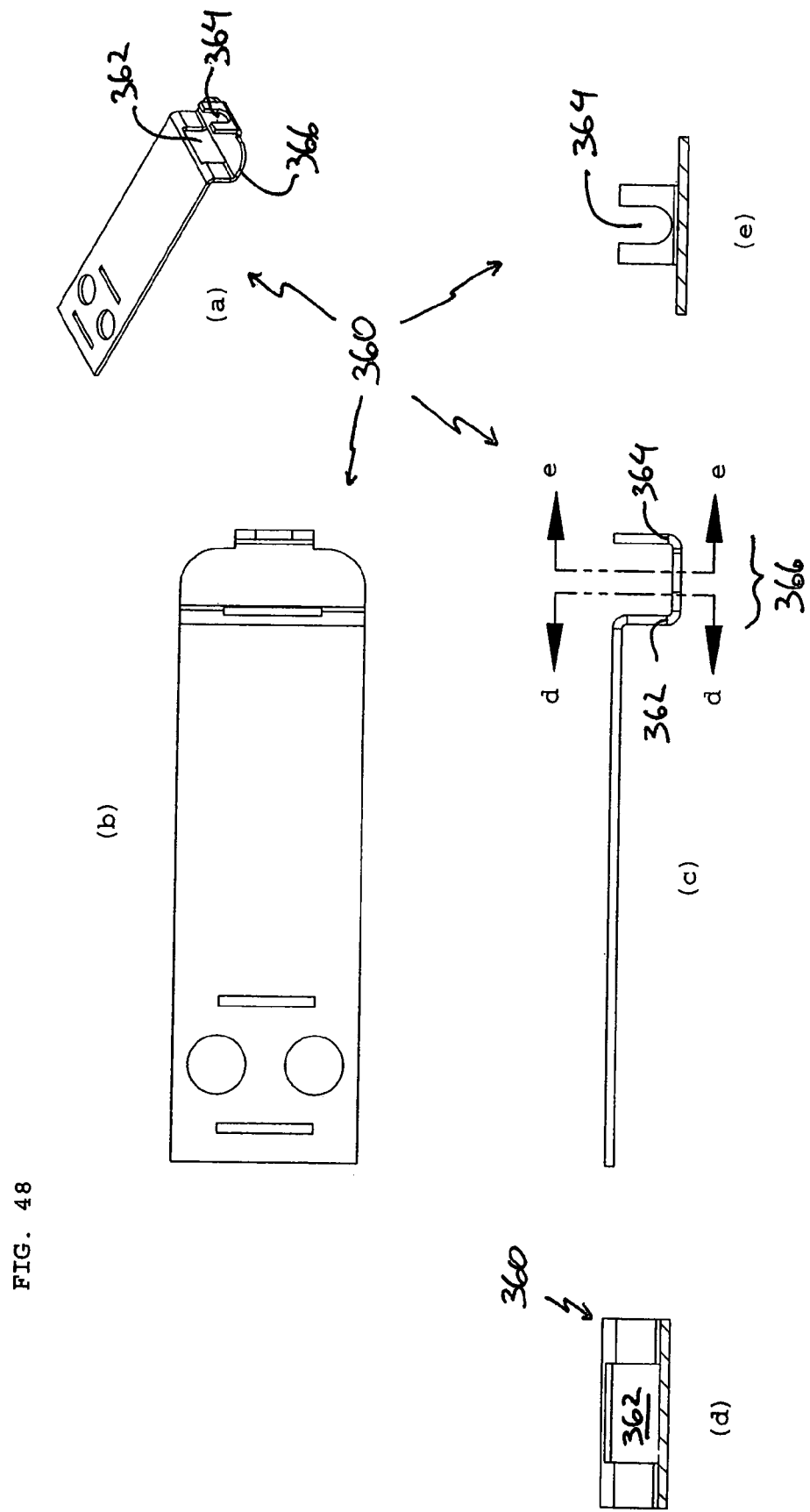
FIG. 48 depicts perspective, top, side, front and back views of another embodiment of a locking rod guard for use with a raceway system according to the present disclosure.
Figure 49:
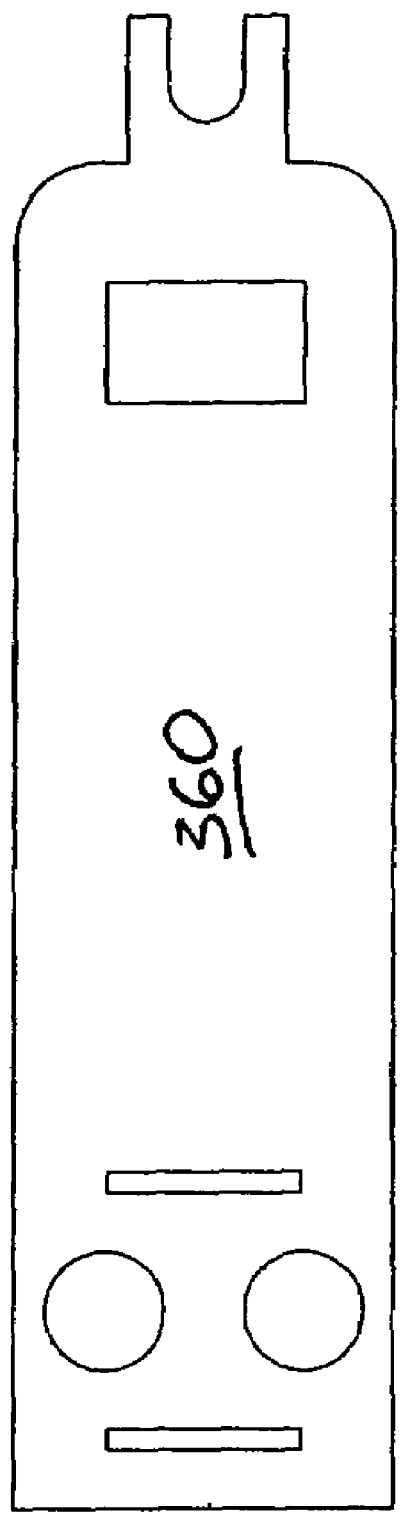
FIG. 49 depicts a top view of a sheet metal cutout to form the locking rod guard depicted in FIG. 48.
Figure 50:
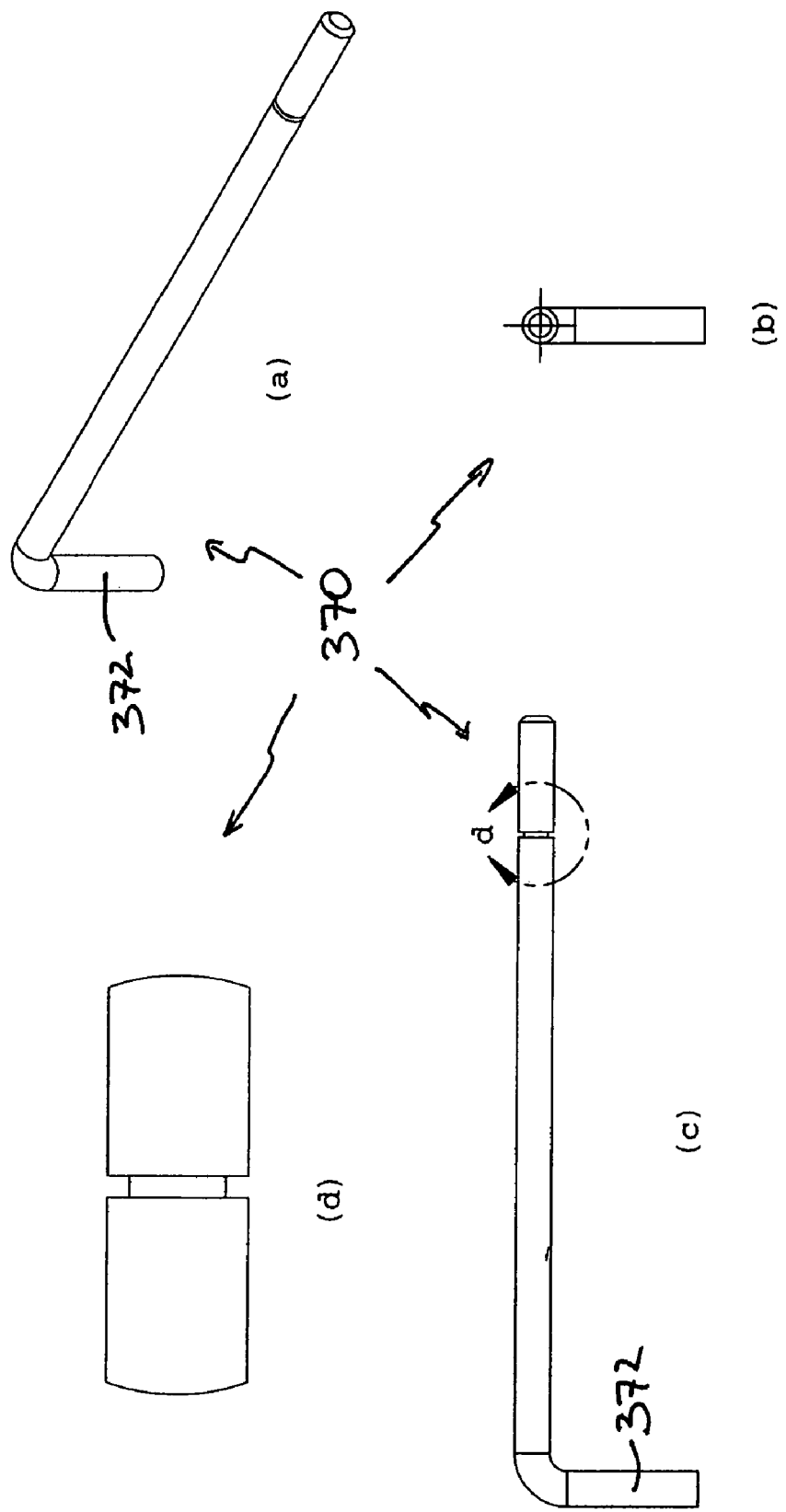
FIG. 50 depicts perspective, side, front, and detail views of another embodiment of a locking rod for use with a raceway system according to the present disclosure.
Figure 51:
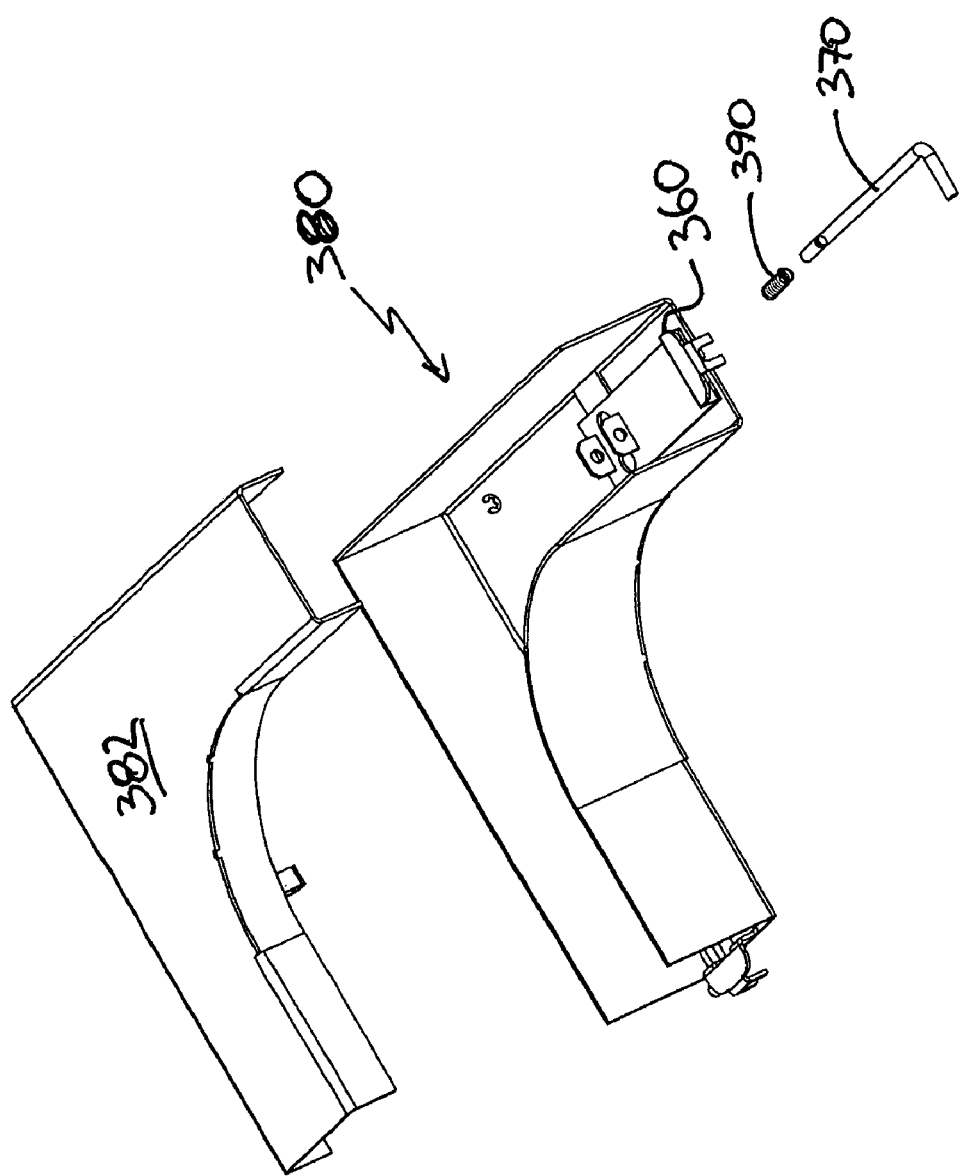
FIG. 51 depicts an exploded assembly perspective view of an embodiment of a corner raceway and top cover with the locking rod depicted in FIG. 50 and locking rod guard depicted in FIG. 49 for use with a raceway system according to the present disclosure.

With reference to FIG. 48, another embodiment of a locking rod guard 360 for use with a raceway system according to the present disclosure may also be formed from a sheet of material, as shown in FIG. 49. The locking rod guard is formed with a generally flat body that is bent into a U-shaped member 366 at one end. The flat body is sized to be attached within a raceway 380, as shown in FIGS. 51 and 52. The U-shaped end is formed with two apertures 362, 364 sized to cooperate in receiving a locking rod 370 (shown in FIG. 50), as can be seen in FIG. 51. The locking rod 370 is formed with one end 372 extending at an angle from the body, shown in the figure as a right angle. When disposed with the bent end 372 within the U-shaped member 366 of the locking rod guard 360, the locking rod 370 cannot be slid out of the guard. It will be appreciated from FIG. 52 that once the top cover plate 382 of the raceway 380 is placed over and secured to the raceway, the locking rod 370 cannot be removed. A spring 390 may be provided around the locking rod 370 to bias the rod.

Figure 53:
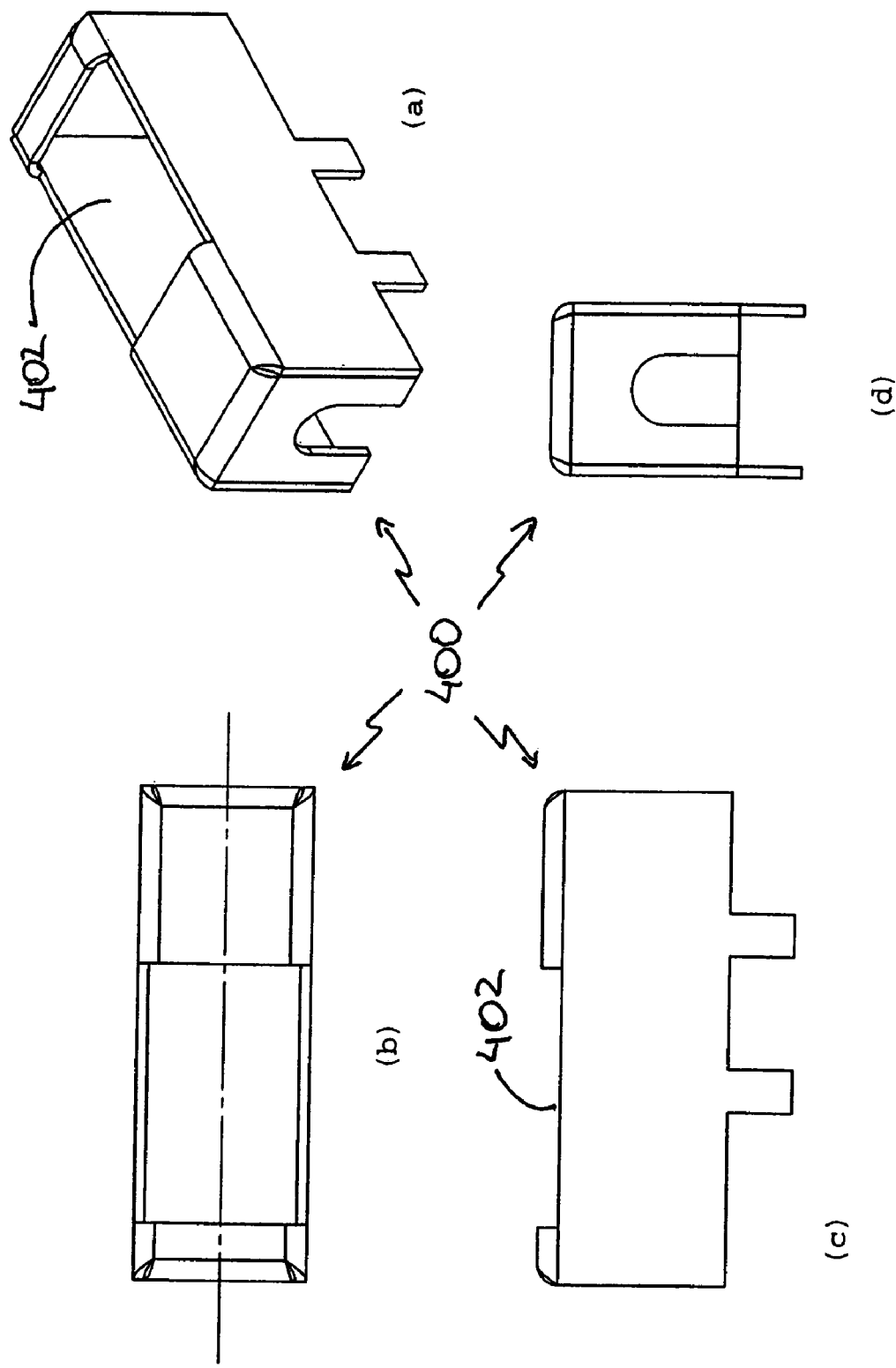
FIG. 53 depicts perspective, top, side and front views of another embodiment of a raceway top cover for use with a raceway system according to the present disclosure.
Figure 54:
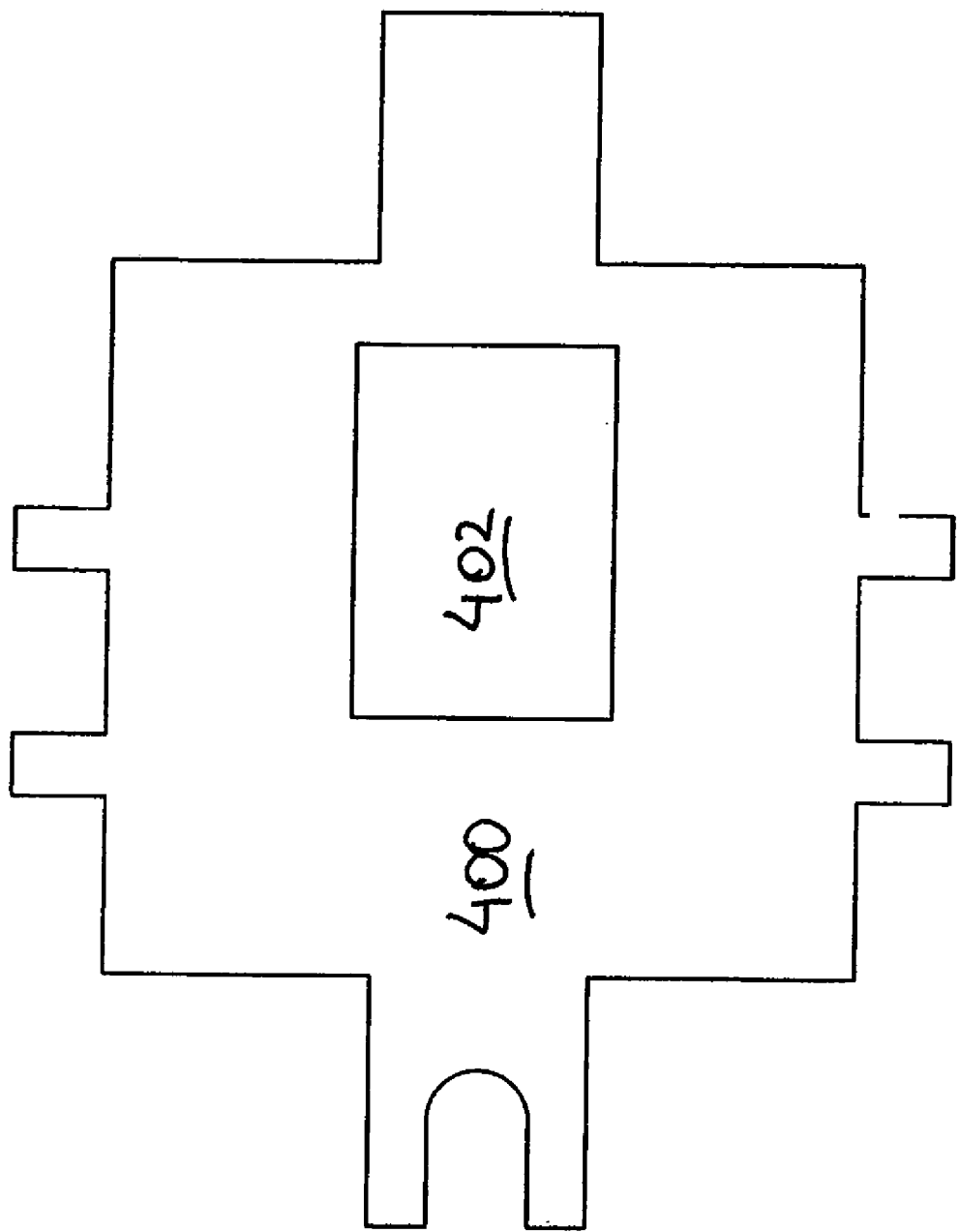
FIG. 54 depicts a top view of a sheet metal cutout to form the raceway top cover depicted in FIG. 46.

With reference to FIG. 53, another embodiment of a raceway top cover 400 for use with a raceway system according to the present disclosure is formed with an access opening 402. The raceway top cover 400 may be formed from a sheet of material, as shown in FIG. 54. This top cover 400 may be used to cover part of a locking device such as locking device 350. It protects the inner workings of the lock body from tampering from within the secured (closed) raceway. The piece is fastened to the lock body.

The aperture 402 allows the locking section of the lock connector to align and seat into the lock body. This secures the entire system.

It will therefore be seen that this system is entirely secure from outside access or penetration, since it cannot be unlocked other than by release from within a secure enclosure, and the secure enclosure itself can be opened only by authorized persons. There are no external points of entry where an intruder can gain access. All covers are locked to the raceways either the snap-in connectors or by the locking plate assemblies. Any attempt to enter the secure enclosure or the secure conduit is visible to observers, particularly on those segments of the system where the raceways are mounted on standoffs from the underlying supporting wall or other structure. If it is desired to reenter the conduit, as for instance to lay additional cables or pipes through the conduit, or gain access to a faulty cable or pipe, one can only initiate access through a secure enclosure. In a manually operated embodiment, a user will pull on one of the access cables attached to a locking rod in a locking plate assembly to retract the rod and coil spring, removing the rod from the aperture in the lock plate connector. That section of the raceway cover can now be lifted out, exposing the locking plate assembly for removal be releasing the side pins from under the raceway internal ribs. The interior of the raceway is then entirely open and the cables, pipes, etc. within can readily be accessed. (The removal steps for removal of the released locking plate will depend on the structure of each embodiment of the locking plate, as will be evident to those skilled in the art from the descriptions of exemplary embodiments herein. Essentially unlocking and removal steps are merely the reverse of the assembly and locking steps.)

In addition to the obvious security provided to the cables, pipes, etc., the present invention also eliminates the time-consuming, tedious and often quite difficult process of "fishing" a cable, wire, etc. through a secure conduit. One can now simply lay the cable, etc. directly into the open raceway and then securely close the raceway over it with the covers and locking devices. This advantage is particular notable for pipes and other relatively rigid tubes which cannot usually be fished without extreme difficulty, and often cannot be fished at all. Such rigid devices can now simply be laid into the conduits and readily accessed and removed when required.

The materials from which the raceways, top covers and other portions of the system will be made will usually be a matter of choice, guided by any specifications defined by the environment or use of the system. For instance, NSTISSI 7003 defines materials which are required to be used in PDS systems, such as steel. NSTISSI 7003 does, however, also recognize Simple Distribution Systems (SDS) as a subset of PDS, for which broader ranges of materials are acceptable. Further, for those systems for which neither PDS nor SDS standards are applicable, the choice of materials can be based on the user's determination of what materials are appropriate for the system of interest.

Therefore, within any limits defined by applicable published specifications such as NSTISSI 7003, it is anticipated that most components, such as raceways, top covers, and locking mechanisms will normally be formed from metal, especially steel or heavy gauge aluminum, although other non-ferrous metals such as zinc or brass as well as various specialty ferrous or non-ferrous alloys may also be used. Woods, ceramics or various plastics, particularly those known as engineering plastics, or any other material which meets local security requirements may also be used.

Spring metal plates will be a springy material, normally a spring steel. The pull wire or halyard for manual or mechanical operation may be metal wire or a strong ceramic fiber or glass fiber or polymeric strand material, or may be a rigid rod of metal or fiber. Ordinary cord such as cotton or organic fiber cord is preferably avoided because of its low strength and potential for deterioration. Where the release mechanism is pneumatically or hydraulically operated appropriate fluid tubing will be used. It is preferred that the locking devices be positioned relatively close to their adjacent secure enclosures 6 such that pull wires or fluid tubes may be kept to a reasonably short length (e.g., about 1–3 feet [30–100 cm]). This will facilitate operation of the release mechanisms and avoid problems such as kinking in the pull wire or tube. Also preferably the pull wire or tube should not extend around a bend in the system 2, especially a sharp bend, but if such is necessary it is useful to have a guide (not shown) at the interior of the bend to guide the wire or tube around the bend and minimize movement friction and to avoid creating sharp bends and perhaps kinks in the wire or tube.

In further embodiments of secure conduits contemplated by the present disclosure, a raceway or conduit provides security against electronic "eavesdroppers" by providing shielding or insulation to block electromagnetic radiation. As is well known, a conductor such as a cable or wire carrying an electric signal or current will generate an electromagnetic field around the conductor that can induce, either magnetically or by capacitive coupling, an electric current in a nearby conductor such as a metallic conduit or raceway enclosing the conductor. As will be appreciated, sensing the induced electric current can provide a mirror copy of the signal carried by the conductor. The security pitfalls posed by this phenomenon are therefore immediately apparent: providing a physically secure conduit is not overly beneficial if the sensitive data carried by the enclosed cabling can be monitored from outside of the conduit.

Although a properly shielded conductor will typically not generate a substantial magnetic field, shielding can be bulky and expensive.

Figure 56:
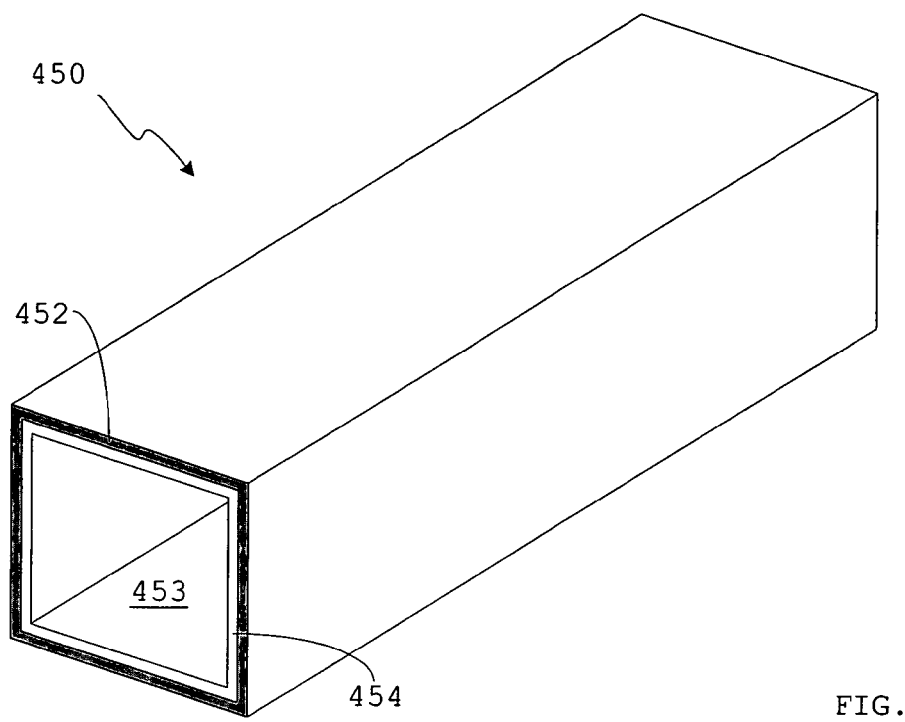
FIG. 56 depicts a perspective view of a conduit with an electromagnetic shield in accordance with the present disclosure.

The present disclosure thus contemplates a conduit that provides an electromagnetic shield to prevent any electromagnetic radiation emitted within the conduit from exiting the conduit, or from being monitored or sensed from outside of the conduit. Thus, generally speaking and with reference to FIG. 56, in one embodiment of a conduit contemplated by the present disclosure, a conduit 450 is formed with an elongate member 452 defining an interior passage 453 for enclosing electrical signal conductors (not shown) such as cables and wires, and with an electromagnetic shield 454 disposed coaxially with the elongate member to block electromagnetic radiation that may be emitted by the electrical signal conductors due to the electrical signals they may be carrying. The elongate member 452 will typically provide the mechanical strength required to attach the conduit 450 to supporting surfaces and, optionally, withstand physical penetration attempts.

Figure 57:
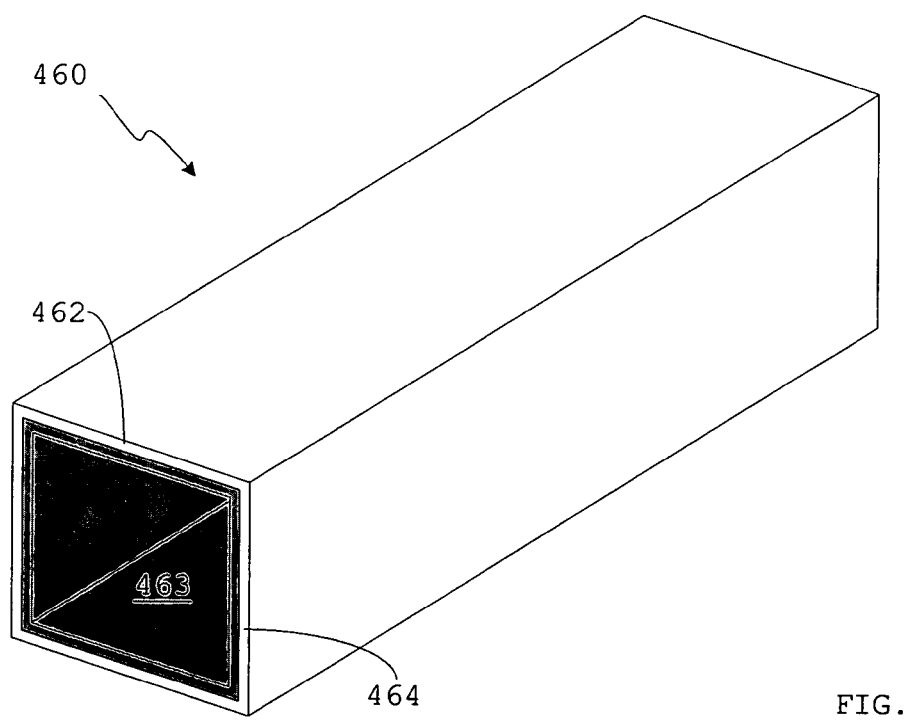
FIG. 57 depicts a perspective view of another conduit with an electromagnetic shield in accordance with the present disclosure.

The disposition of the electromagnetic shield with respect to the elongate member is not material to the practice of this concept, and thus any and all methods of providing an elongate member with an electromagnetic shield are contemplated hereby. The embodiment of FIG. 56 disposes the electromagnetic shield 454 in direct contact with the inner surface of elongate member 452. Alternatively, as shown in FIG. 57, a conduit 460 may be formed with an elongate member 462 defining an inner passage 463, and an electromagnetic shield 464 disposed in direct contact with the outer surface of the elongate member. These two embodiments are shown with elongate members having a generally rectangular cross-section, but it must be understood that the novel concept contemplated herein is not limited to any particular geometry of the elongate member or the electromagnetic shield, nor to any particular number of elongate members or electromagnetic shields.

Furthermore, it must also be understood that the elongate member and electromagnetic shield are not the only two constituent parts of the novel conduit disclosed herein.

Additional parts or layers may be provided to an electromagnetically shielded conduit as disclosed herein, and there is no requirement that the electromagnetic shield and the elongate member be in direct contact with one another. Thus, an additional layer or layers, such as a layer of adhesive, may be provided between the elongate member and the electromagnetic shield.

Figure 58:
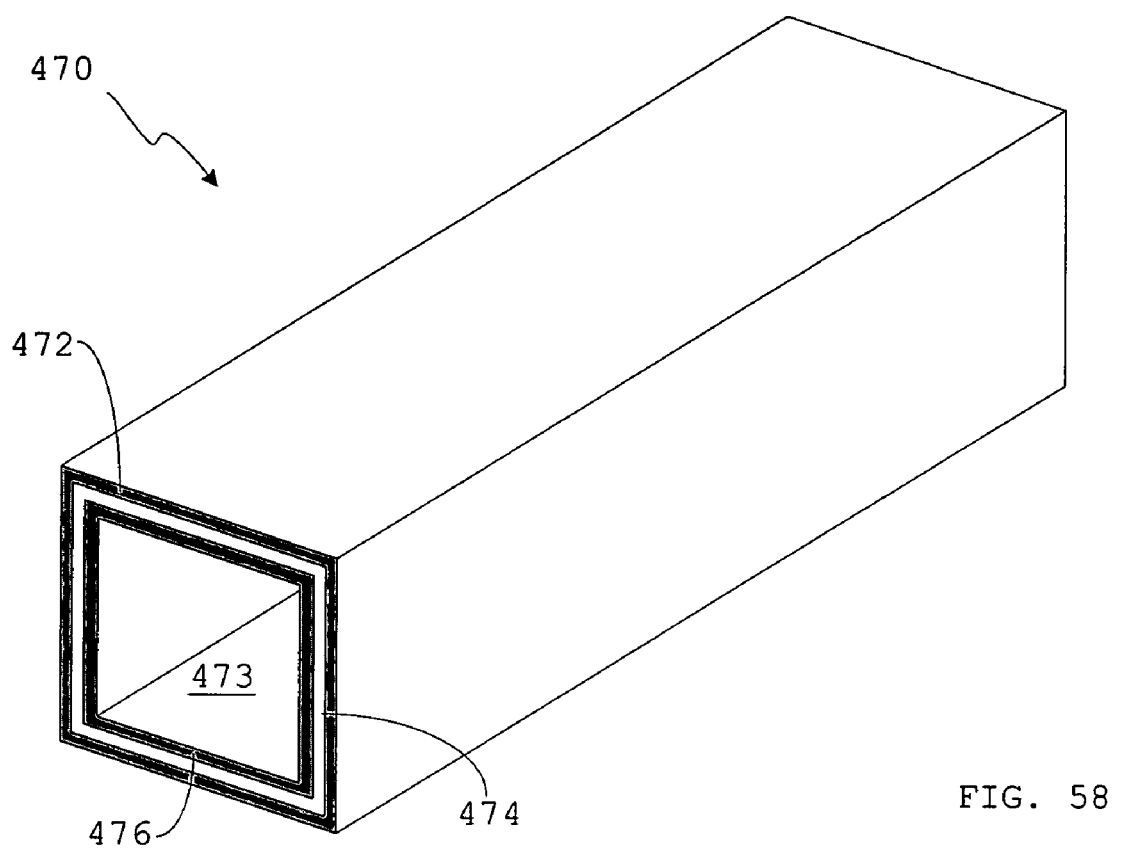
FIG. 58 depicts a perspective view of another conduit with an electromagnetic shield in accordance with the present disclosure.

By way of example, in another embodiment as depicted generally in FIG. 58, a conduit 470 may be formed with an elongate member 472 defining inner passage 473, and a composite electromagnetic shield provided by a dielectric layer 474 disposed on the inner surface of the elongate member and a conductive layer 476 disposed onto the dielectric layer and surrounding inner passage 473.

Electromagnetic fields generated by conductors lying within passage 472 and carrying electrical signals would induce electrical currents in the inner conductive layer 476, which would thereby act to largely block the electromagnetic fields, and the dielectric layer 474 would insulate the elongate member 472 from the inner conductive layer so that the currents induced in the inner conductive layer could not be sensed and monitored from outside of the conduit 470.

Figure 59:
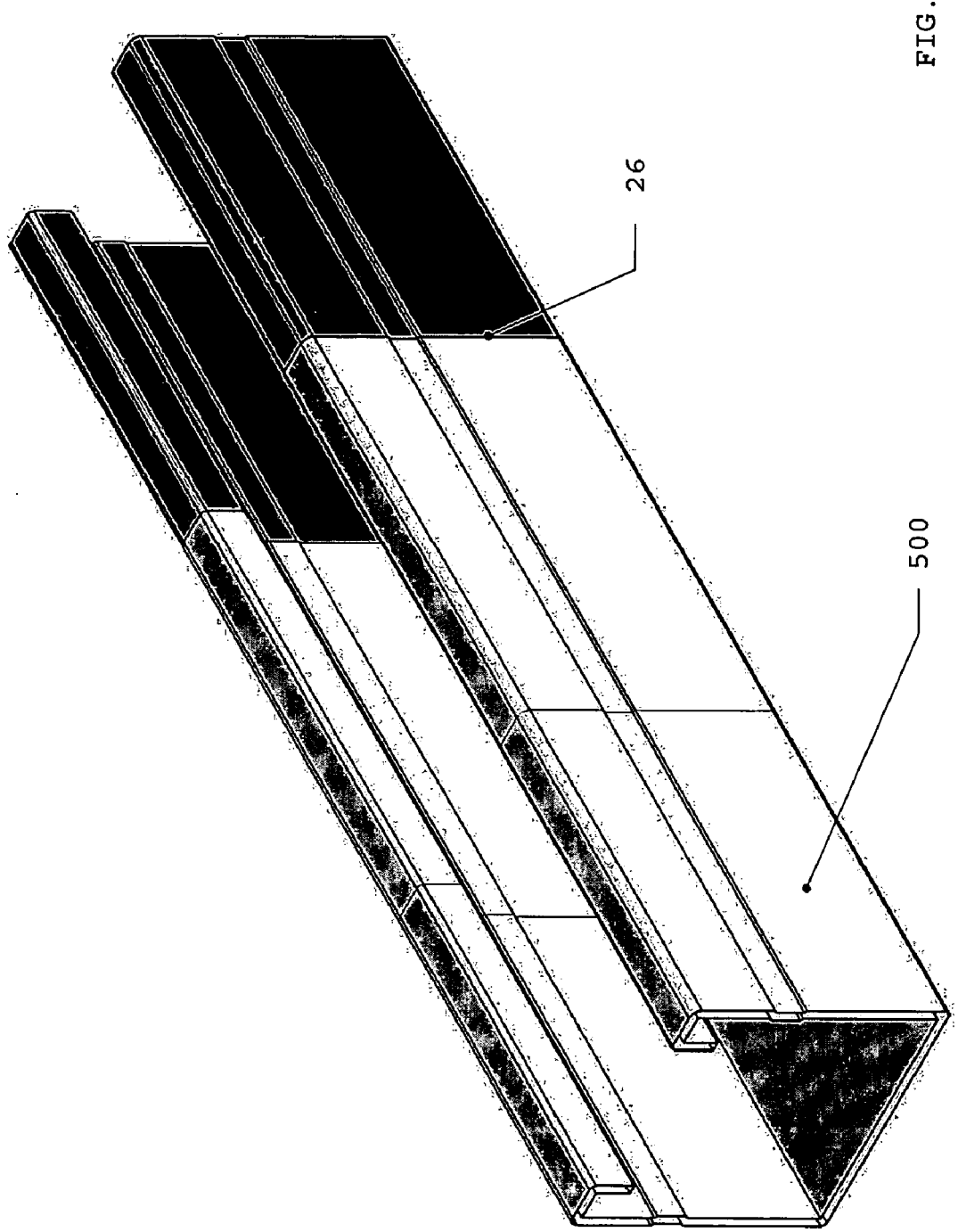
FIG. 59 depicts a perspective view of another conduit with an electromagnetic shield in accordance with the present disclosure.
Figure 60:
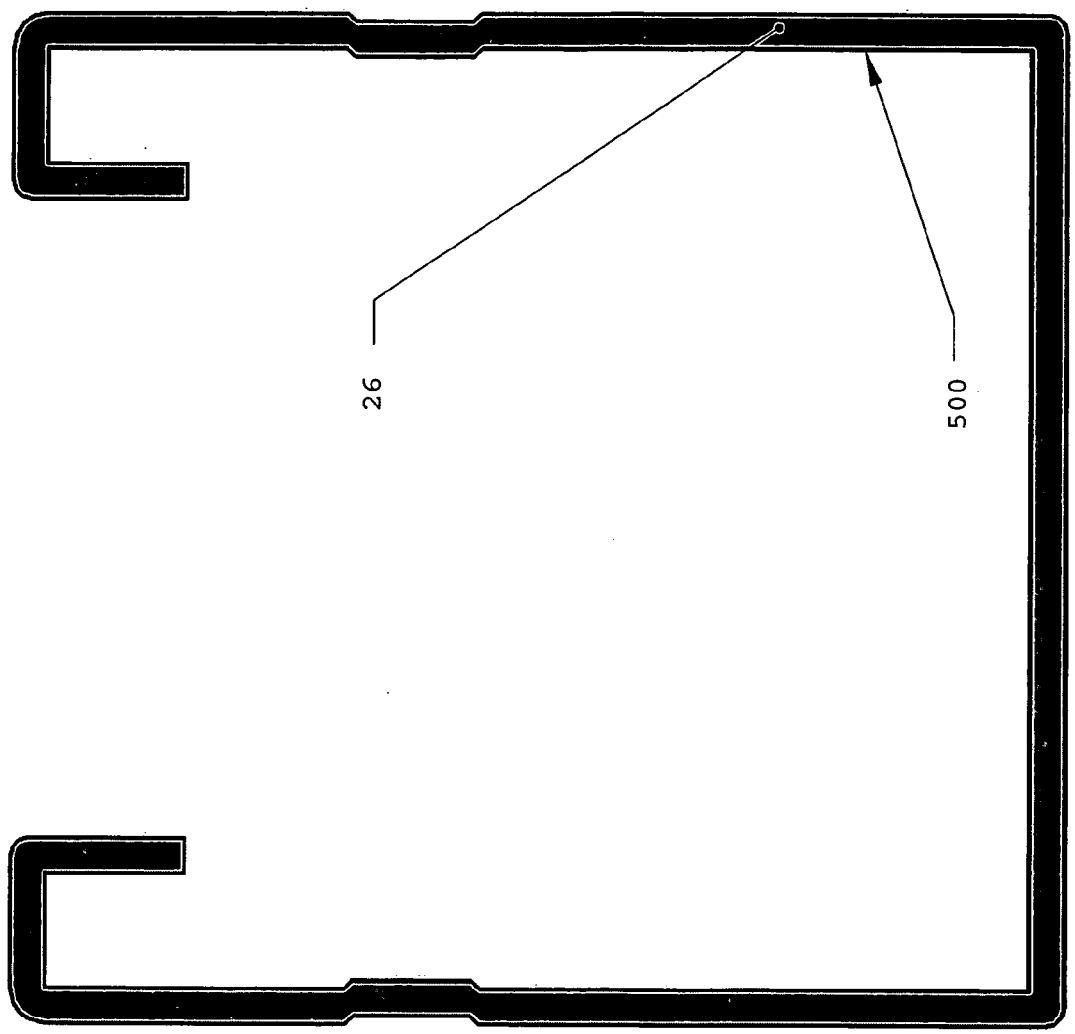
FIG. 60 depicts a front view of the conduit with an electromagnetic shield depicted in FIG. 59.

For purposes of further example, and as shown in FIGS. 59 and 60, a raceway 26 as described elsewhere herein may be provided with a layer or coating 500 of a dielectric material over its outer surface. Dielectric materials are electrically non-conductive and therefore an electromagnetic field will not induce an electric current in the outer coating 500. Furthermore, any currents induced in raceway 26 would not be capable of being sensed and monitored from outside of the raceway because the dielectric layer would not conduct the induced current to its outer surface.

Figure 61:
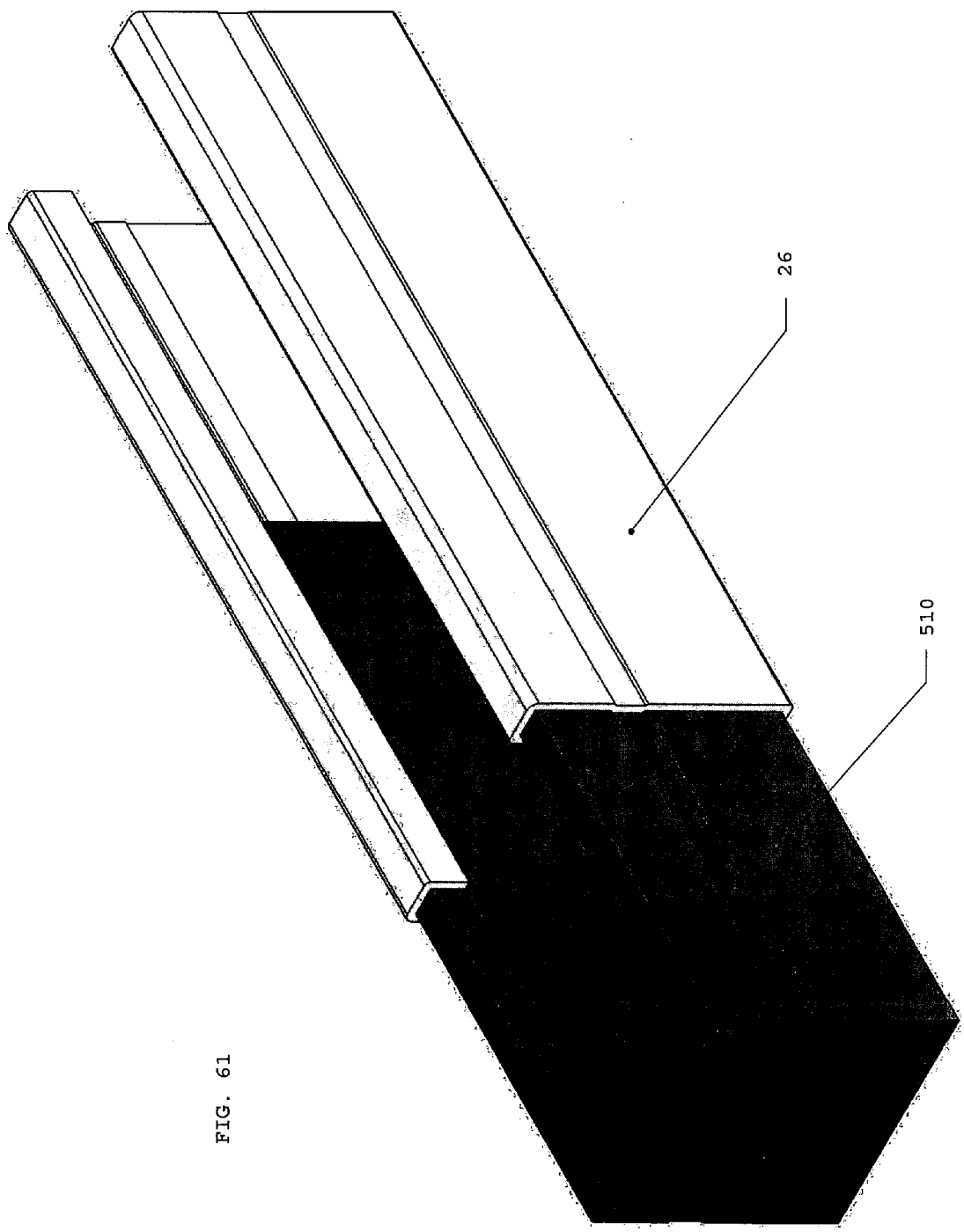
FIG. 61 depicts a perspective view of another conduit with an electromagnetic shield in accordance with the present disclosure.
Figure 62:
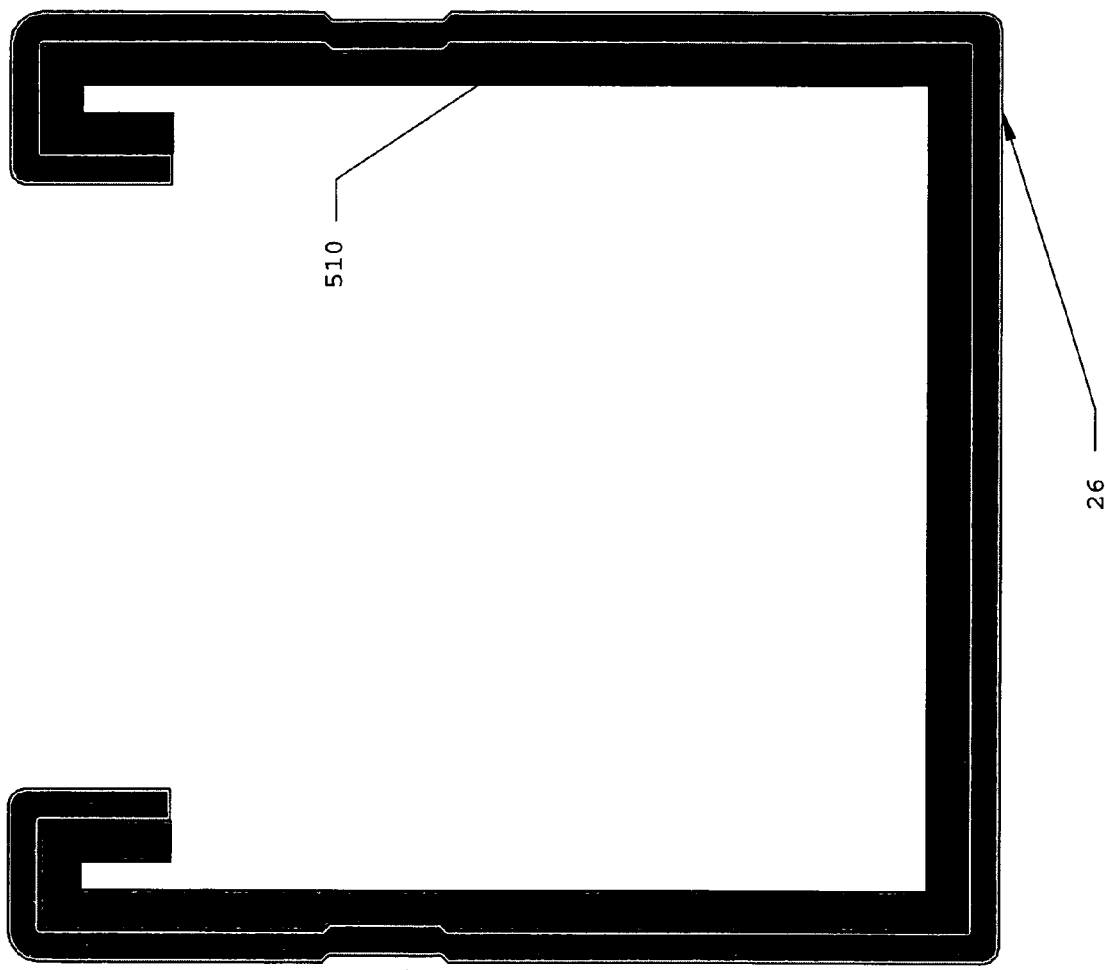
FIG. 62 depicts a front view of the conduit with an electromagnetic shield depicted in FIG. 61.

In still another example, as shown in FIGS. 61 and 62, a raceway 26 as described elsewhere herein may be provided with an inner layer 510 of a dielectric material in contact with its inner surface. The inner dielectric layer 510 would preferably be provided in a thickness sufficient to substantially attenuate any electromagnetic fields generated by conductors carrying electrical signals within the raceway 26 so as to substantially eliminate any induced currents in the raceway.

Many materials are available for forming an electromagnetic shield. These would typically be dielectric or substantially dielectric materials such as glass, vinyl, Teflon, fiberglass, etc. For a composite electromagnetic shield such as that of the embodiment of FIG. 58, the inner conductive layer would preferably be a very good electric conductor, such as copper, although any other practicable material is contemplated herein. In one embodiment, the electromagnetic shield may be formed from a printed circuit board (PCB) that may be co-extruded in the shape of the inner passage of the conduit. A PCB is typically formed as a conductive layer (e.g. copper) applied over a layer of relatively stiff, durable dielectric material. In this manner the conduit may be retrofitted with an electromagnetic shield in the form of a co-extruded PCB structure that may be inserted into the conduit to surround electrical signal conductors carried therein.

Figure 63:
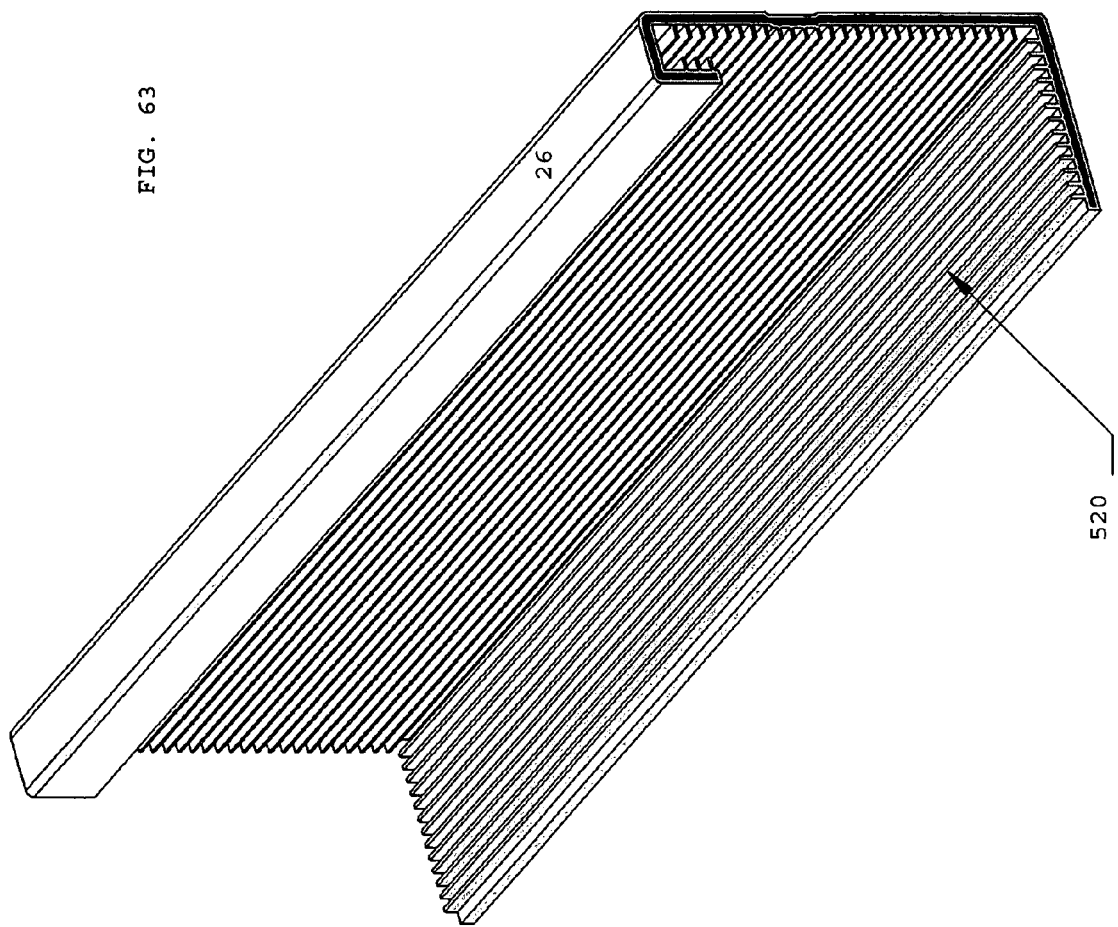
FIG. 63 depicts a perspective sectional view of another conduit with an electromagnetic shield in accordance with the present disclosure.

In further embodiments contemplated herein, a conduit may be provided with an electromagnetic shield that does not absorb electromagnetic fields but rather reflects them. This may be achieved by forming the electromagnetic shield with a particular geometry and from particular materials that reflect electromagnetic fields, and disposing such shields on the inner surface of the elongate member of the conduit to thereby reflect electromagnetic fields back into the conduit. Two examples are provided for illustration purposes only in FIGS. 63 and 64. With reference to FIG. 63, a raceway 26, shown in a cut-away perspective view, may be formed with an electromagnetic shield comprised of a plurality of projections 520 extending from the inner surface of the raceway. The projections may be formed with a geometry (e.g. shape and size) calculated to encourage phase cancellation in electromagnetic fields generated from within the raceway.

Figure 64:
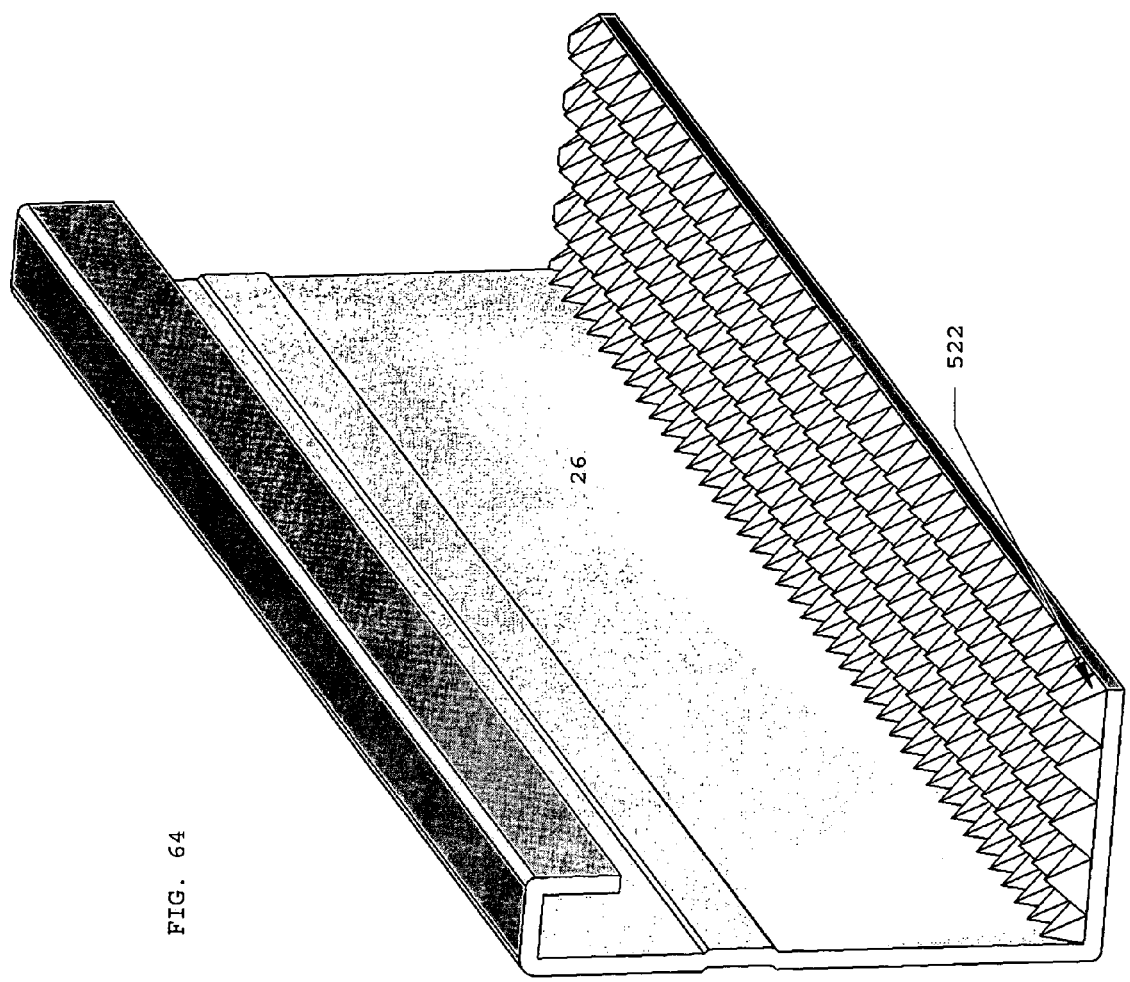
FIG. 64 depicts a perspective sectional view of another conduit with an electromagnetic shield in accordance with the present disclosure.

In the embodiment of FIG. 64, the projections 520 are formed as longitudinally extending ribs. In the embodiment of FIG. 64, the electromagnetic shield is comprised of a plurality of projections 522 formed as polyhedrons, and in particular in the shape of pyramids. FIG. 63 shows the projections 522 extending from only one wall of raceway 26 for clarity, but it must be understood that an electromagnetic shield of any type may be provided on all walls of a raceway 26 as well as on a cover such as cover 28. As those skilled in the art will appreciate, the possibilities for electromagnetic reflecting geometries are essentially endless.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicants have made this disclosure with respect to the current state of the art, but also contemplate advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . ."

What is claimed is:

1. A conduit, comprising:
   an elongate channel with an outer surface and three walls and a cover adapted to be disposed over an open side of one or more channels to define an inner passage with an inner surface for enclosing one or more electrical signal conductors therein, the cover adapted to be removably attached to the elongate channel by a locking device disposed within the respective channel and adapted to be operated only from within the channel; and an electromagnetic shield disposed coaxially with the elongate channel to block electromagnetic radiation emitted by the one or more electrical signal conductors.

2. The conduit of claim 1, wherein the electromagnetic shield comprises:

a dielectric layer disposed over either one or both surfaces of the elongate channel.

3. The conduit of claim 2, wherein the dielectric layer is disposed over the inner surface of the elongate channel and the electromagnetic shield further comprises:

an electrically conductive layer disposed within, and surrounding, the inner passage of the elongate channel.

4. The conduit of claim 1, wherein the electromagnetic shield comprises:

a printed circuit board consisting of a conductive layer applied over a dielectric layer, the printed circuit formed to be received in the inner passage with the dielectric layer adjacent the inner surface of the elongate channel.

5. The conduit of claim 1, wherein the electromagnetic shield comprises:

a plurality of electromagnetically reflective projections extending from the inner surface of the elongate channel into the inner passage.

6. A method of forming a conduit, comprising:

selecting an elongate channel with an outer surface and an inner surface defining an inner passage for enclosing one or more electrical signal conductors therein, the channel comprising three walls and a cover adapted to be disposed over an open side of one or more channels to define the inner passage, the cover adapted to be removably attached to the elongate channel by a locking device disposed within the respective channel and adapted to be operated only from within the channel; and disposing an electromagnetic shield coaxially with the elongate channel to block electromagnetic radiation emitted by the one or more electrical signal conductors.

7. The method of claim 6, wherein disposing the electromagnetic shield comprises:

disposing a dielectric layer in contact with either one or both surfaces of the elongate channel.

8. The method of claim 6, wherein disposing the electromagnetic shield comprises:

forming a plurality of electromagnetically reflective projections to extend from the inner surface of the elongate channel into the inner passage.

9. A conduit system, comprising:

two conduits, each conduit comprising an elongate channel having three walls and a cover adapted to be disposed over an open side of one or more channels to define an inner passage for enclosing one or more electrical signal conductors therein, the cover adapted to be removably attached to the elongate channel by a locking device disposed within the respective channel and adapted to be operated only from within the channel, each conduit further comprising an electromagnetic shield disposed coaxially with the elongate channel to block electromagnetic radiation emitted by the one or more electrical signal conductors; and a connector for connecting the conduits to form an extended inner passage.

10. The conduit system of claim 9, wherein the electromagnetic shield comprises:

a dielectric layer in contact with either one or both surfaces of the elongate channel.

11. The conduit system of claim 9, wherein the electromagnetic shield comprises:

a plurality of electromagnetically reflective projections extending from the inner surface of the elongate channel.

12. The conduit system of claim 9, wherein the connector comprises:

an electromagnetic shield to block electromagnetic radiation emitted by the one or more electrical signal conductors.

13. The conduit system of claim 9, further comprising:

at least one second cover adapted to be disposed over an open side of one or more channels and to be removably attached thereto by a locking device, the locking device disposed within the respective channel and adapted to be remotely operated by an elongated member extending through one of the open ends of the conduit.

14. The conduit system of claim 9, wherein the electromagnetic shield comprises:

a dielectric layer in contact with a surface of each of the three walls and the cover.

15. The conduit system of claim 9, wherein the electromagnetic shield comprises:

a plurality of electromagnetically reflective projections extending from the three walls and the cover into the inner passage.

* * * * *